US007943239B2

(12) United States Patent
Miyamoto

(10) Patent No.: US 7,943,239 B2
(45) Date of Patent: May 17, 2011

(54) ENDLESS BELT AND PROCESS FOR MANUFACTURING THE SAME, IMAGE FORMING APPARATUS, FUNCTIONAL MEMBRANE AND PROCESS FOR MANUFACTURING THE SAME, INTERMEDIATE TRANSFER BELT, TRANSFER TRANSPORT BELT, AND TRANSPORT APPARATUS

(75) Inventor: Tsuyoshi Miyamoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 794 days.

(21) Appl. No.: 11/798,747

(22) Filed: May 16, 2007

(65) Prior Publication Data

US 2008/0085378 A1 Apr. 10, 2008

(30) Foreign Application Priority Data

Oct. 6, 2006 (JP) ................................ 2006-275685

(51) Int. Cl.
*B32B 27/20* (2006.01)
*G03G 15/16* (2006.01)

(52) U.S. Cl. .................................... 428/411.1; 399/297

(58) Field of Classification Search ........................ None
See application file for complete search history.

(56) References Cited

U.S. PATENT DOCUMENTS

2004/0175875 A1* 9/2004 Sung ............................ 438/197

FOREIGN PATENT DOCUMENTS

| | | |
|---|---|---|
| JP | A 5-200904 | 8/1993 |
| JP | A 6-149083 | 5/1994 |
| JP | A 6-228335 | 8/1994 |
| JP | A 6-258960 | 9/1994 |
| JP | A 2001-125388 | 5/2001 |
| JP | A 2002-86465 | 3/2002 |
| JP | A 2002-86599 | 3/2002 |
| JP | A 2002-148951 | 5/2002 |
| JP | A 2002-148957 | 5/2002 |
| JP | A 2004-205623 | 7/2004 |
| JP | A-2006-267900 | 10/2006 |

OTHER PUBLICATIONS

Machine translation of JP 2006-267900A Oct. 2006.*

* cited by examiner

*Primary Examiner* — Ramsey Zacharia
(74) *Attorney, Agent, or Firm* — Oliff & Berridge, PLC

(57) ABSTRACT

An endless belt includes a layer including at least a first composition and a second composition different from the first composition, a content ratio of the second composition relative to the first composition being changed in a layer thickness direction.

11 Claims, 8 Drawing Sheets

ENDLESS BELT AND PROCESS FOR MANUFACTURING THE SAME, IMAGE FORMING APPARATUS, FUNCTIONAL MEMBRANE AND PROCESS FOR MANUFACTURING THE SAME, INTERMEDIATE TRANSFER BELT, TRANSFER TRANSPORT BELT, AND TRANSPORT APPARATUS

CROSS-REFERENCE TO RELATED APPLICATIONS

This application is based on and claims priority under 35 USC 119 from Japanese Patent Application No. 2006-275685 filed Oct. 6, 2006.

BACKGROUND

1. Technical Field

The present invention relates to an endless belt and a process for manufacturing the same, an image forming apparatus, a functional membrane and a process for manufacturing the same, an intermediate transfer belt, a transfer transport belt, and a transport apparatus.

2. Related Art

In an electrophotographic image forming apparatus, a charge is formed on a photoreceptor containing a photoconductive material, an electrostatic latent image is formed thereon with laser light based on a modulated image signal, and the electrostatic latent image is developed with a charged toner to obtain a toner image. Then, this toner image is transferred onto a recording medium such as a paper sheet directly or via an intermediate transfer medium to obtain an image.

SUMMARY

According to an aspect of the invention, there is provided an endless belt including a layer including at least a first composition and a second composition different from the first composition, a content ratio of the second composition relative to the first composition being changed in a layer thickness direction.

BRIEF DESCRIPTION OF THE DRAWINGS

Exemplary embodiments of the present invention will be described in detail based on the following figures, wherein.

DETAILED DESCRIPTION

Exemplary embodiments of the present invention will be explained in detail below by referring to drawings. The same symbol is imparted to members having common function and action throughout all drawings, and overlapped explanation will be omitted in some cases.

First Embodiment

Figure 1:
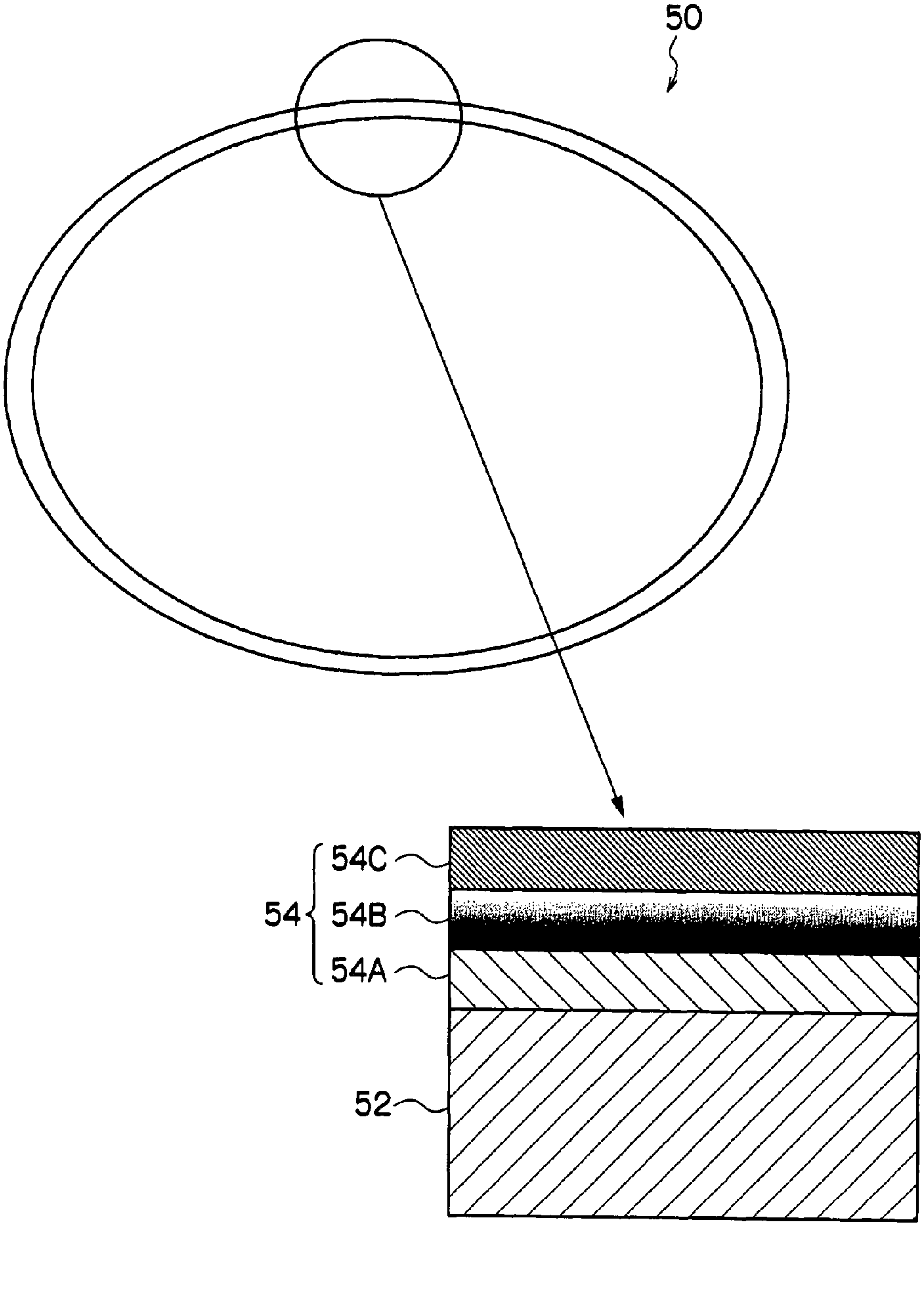
FIG. 1 is a schematic construction view showing an endless belt in accordance with a first embodiment.
Figure 2:
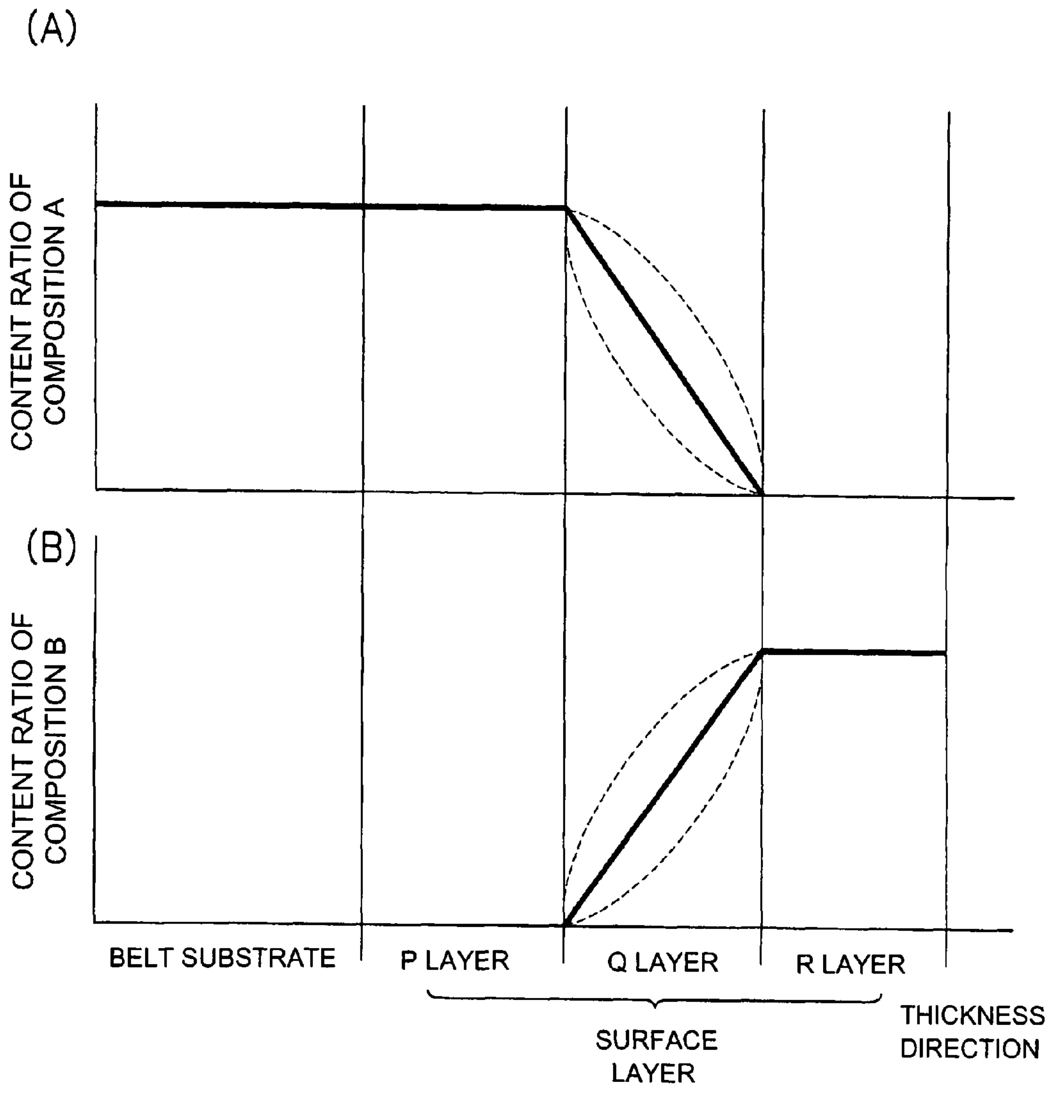
FIG. 2 is a conceptual view showing a content ratio distribution in a layer thickness direction of each composition in an endless belt in accordance with a first embodiment.
Figure 3:
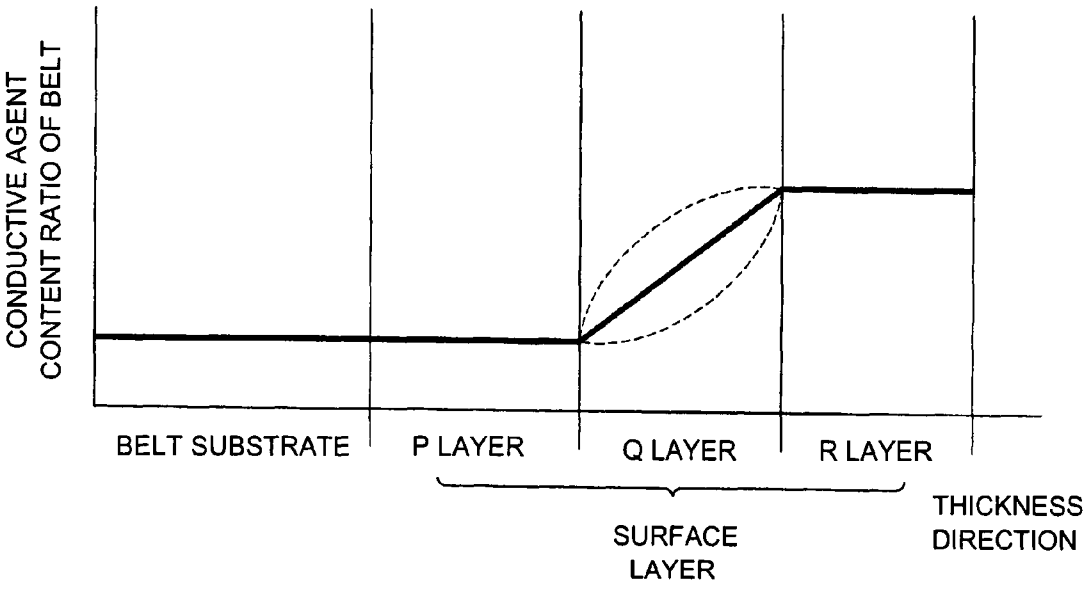
FIG. 3 is a conceptual view showing a content ratio distribution in a layer thickness direction of a conductive agent in an endless belt in accordance with a first embodiment.
Figure 4:
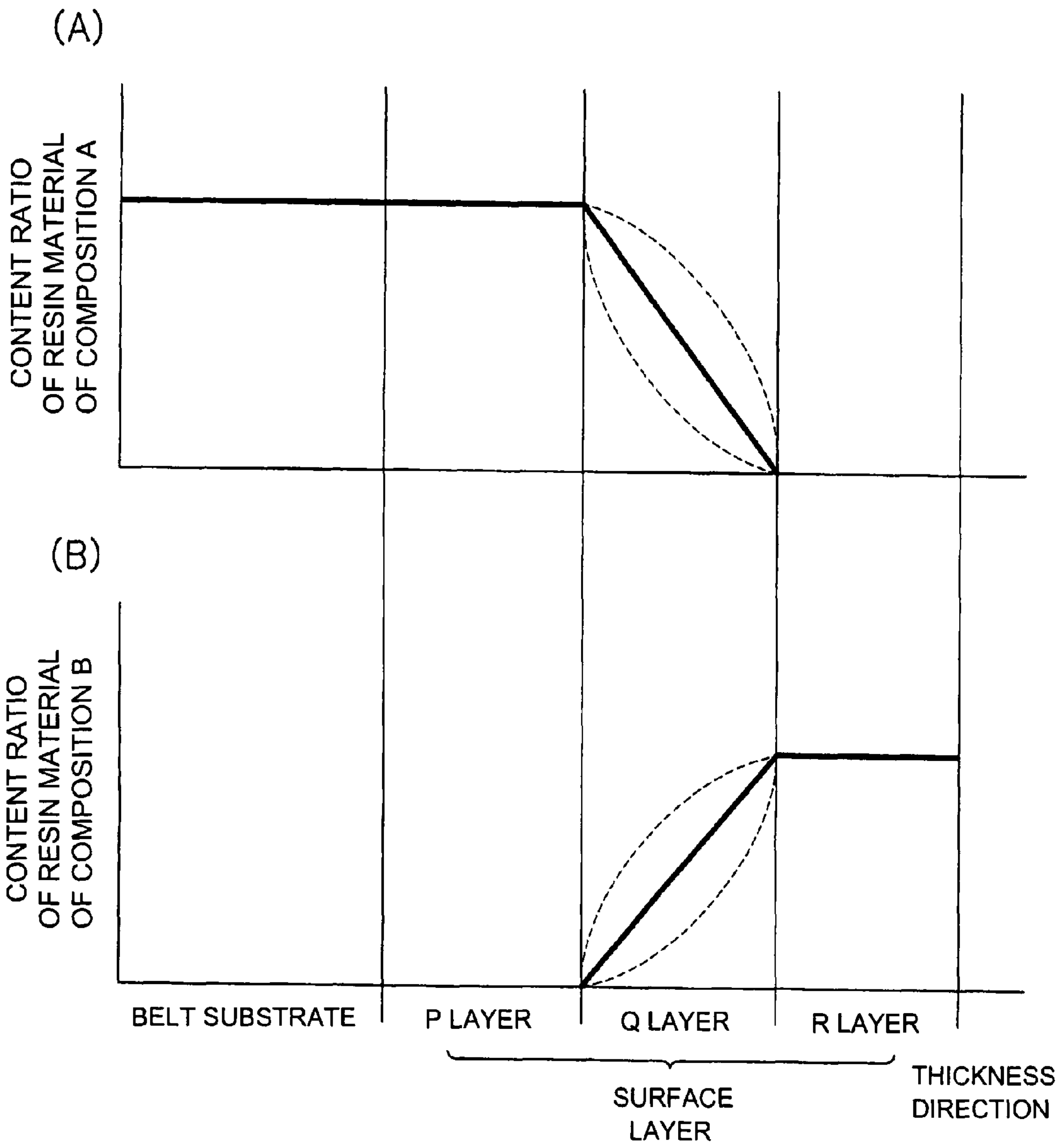
FIG. 4 is a conceptual view showing a content ratio distribution in a layer thickness direction of each resin material in an endless belt in accordance with a first embodiment.

FIG. 1 is a schematic construction view showing an endless belt according to a first embodiment. FIG. 2 is a conceptual view showing a content ratio distribution in a layer thickness direction of each composition in an endless belt in accordance with a first embodiment. FIG. 3 is a conceptual view showing a content ratio distribution in a layer thickness of a conductive agent in an endless belt in accordance with a first embodiment. FIG. 4 is a conceptual view showing a content ratio distribution in a layer thickness of each resin material in an endless belt in accordance with a first embodiment.

An endless belt 50 according to a first embodiment has a belt substrate 52, and a surface layer 54 formed on an outer circumferential surface of the belt substrate 52, as shown in FIG. 1. The surface layer 54 is configured such that a P layer 54A, a Q layer 54B, and an R layer 54 C are sequentially laminated from a belt substrate 52 side.

The belt substrate 52 is composed of a composition A. The P layer 54A in the surface layer 54 is composed of a composition A, the Q layer 54B is composed of a composition A and a composition B, and the R layer 54C is composed of a composition B.

The composition A and the composition B included in each layer include at least, for example, a resin material and a conductive agent, and have different constitution from each other. And, in the Q layer 54B, a content ratio of the composition B relative to the composition A varies in a layer thickness direction.

Specifically, in the endless belt 50, for example, when an attention is paid to a content ratio in a layer thickness direction of the composition A, as shown in FIG. 2 (A), the ratio is a constant value of 100% by weight in the belt substrate 52, the ratio is a constant value of 100% by weight in the P layer 54A in the surface layer 54, the ratio is reduced linearly (linear function-like) from 100% by weight to 0% by weight from a P layer 54A side to an R layer side in the Q layer 54B, and the ratio is a constant value of 0% by weight in the R layer 54C. Herein, although the term “constant” is described, for example, the ratio may vary by about ±5%. The same is applied hereinafter.

On the other hand, when an attention is paid to a content ratio in a layer thickness direction of the composition B, as shown in FIG. 2(B), the ratio is a constant value of 0% by weight in the belt substrate 52, the ratio is a constant value of 0% by weight in the P layer 54A in the surface layer 54, the ratio is increased linearly (linear function-like) from 0% by weight to 100% by weight from a P layer 54A side to an R layer side in the Q layer 54B, and the ratio is a constant value of 100% by weight in the R layer 54C.

Herein, the “constitution of a composition is different” means that a chemical species or a blending amount of a component contained in the composition is different. For example, when a chemical species of a resin material component is different, it is also meant that a chemical species of individual monomer raw material units constituting the resin material, a ratio of blending copolymers thereof, a molecular weight, a molecular weight distribution, a monomer sequence of the copolymer (random copolymer, block copolymer, alternate copolymer), and a polymer chain shape (straight, grafted, ladder-like, dendrimer) are different.

And, in the case where the composition A and the composition B have different conductive agent concentrations (in the case where the composition B has a higher conductive agent concentration than that of the composition A), when an attention is paid to a content ratio in a layer thickness direction of the conductive agent, as shown in FIG. 3, the ratio in the belt substrate 52 is constant and the same as the content ratio in the composition A, the ratio in the P layer 54A in the surface layer 54 is constant and the same as the content ratio in the composition A, the ratio in the Q layer 54B is linearly (linear function-like) changed from the content ratio in the composition A to the content ratio in the composition B from the P layer 54A side to the R layer side, and the ratio in the R layer 54C is a constant value of the content ratio in the composition B. Herein, although the "same" is described, the ratio may vary, for example, by about ±5%. The same is applied hereinafter.

In addition, in the case where the composition A and the composition B have different resin species, when an attention is paid to a content ratio in a layer thickness direction of a resin species of the composition A, as shown in FIG. 4 (A), the ratio in the belt substrate 52 is constant and the same as the content ratio in the composition A, the ratio in the P layer 54A in the surface layer 54 is constant and the same as the content ratio in the composition A, the ratio in the Q layer 54B is reduced linearly (linear function-like) from the content ratio in the composition A to 0% by weight from the P layer 54A side to the R layer side, and the ratio in the R layer 54C is a constant value of 0% by weight.

On the other hand, when an attention is paid to a content ratio in a layer thickness direction of a resin species of the composition B, as shown in FIG. 4 (B), the ratio in the belt substrate 52 is a constant value of 0% by weight, the ratio in the P layer 54A in the surface layer 54 is a constant value of 0% by weight, the ratio in the Q layer 54B is increased linearly (linear function-like) from 0% by weight to the content ratio in the composition B from the P layer 54A side to the R layer side, and the ratio in the R layer 54C is constant and the same as the content ratio in the composition B.

In the Q layer 54B, the content ratios of the composition A, the composition B, the electrically conductive agent and the resin species show a form of being increased or deceased linearly (linear function-like), but are not limited thereto. For example, they may be a form of being increased or decreased like a quadratic function as shown with a dotted line in each figure. Hereinafter, a layer having the same construction as that of the Q layer 54B is referred to as a layer having a concentration gradient structure in some cases.

Figure 5:
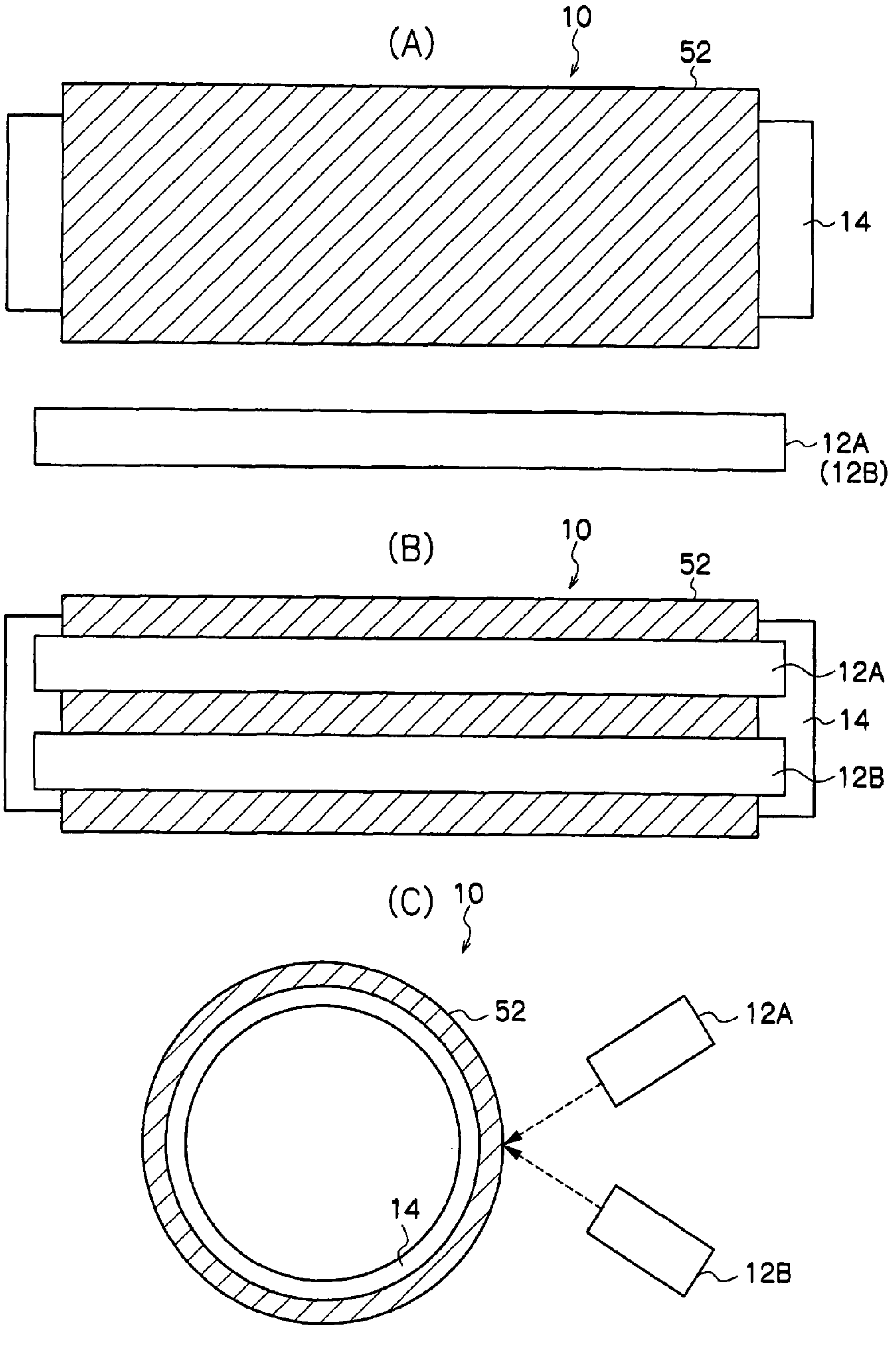
FIG. 5 is a schematic construction view showing a coating apparatus for producing an endless belt according to a first embodiment.
Figure 6:
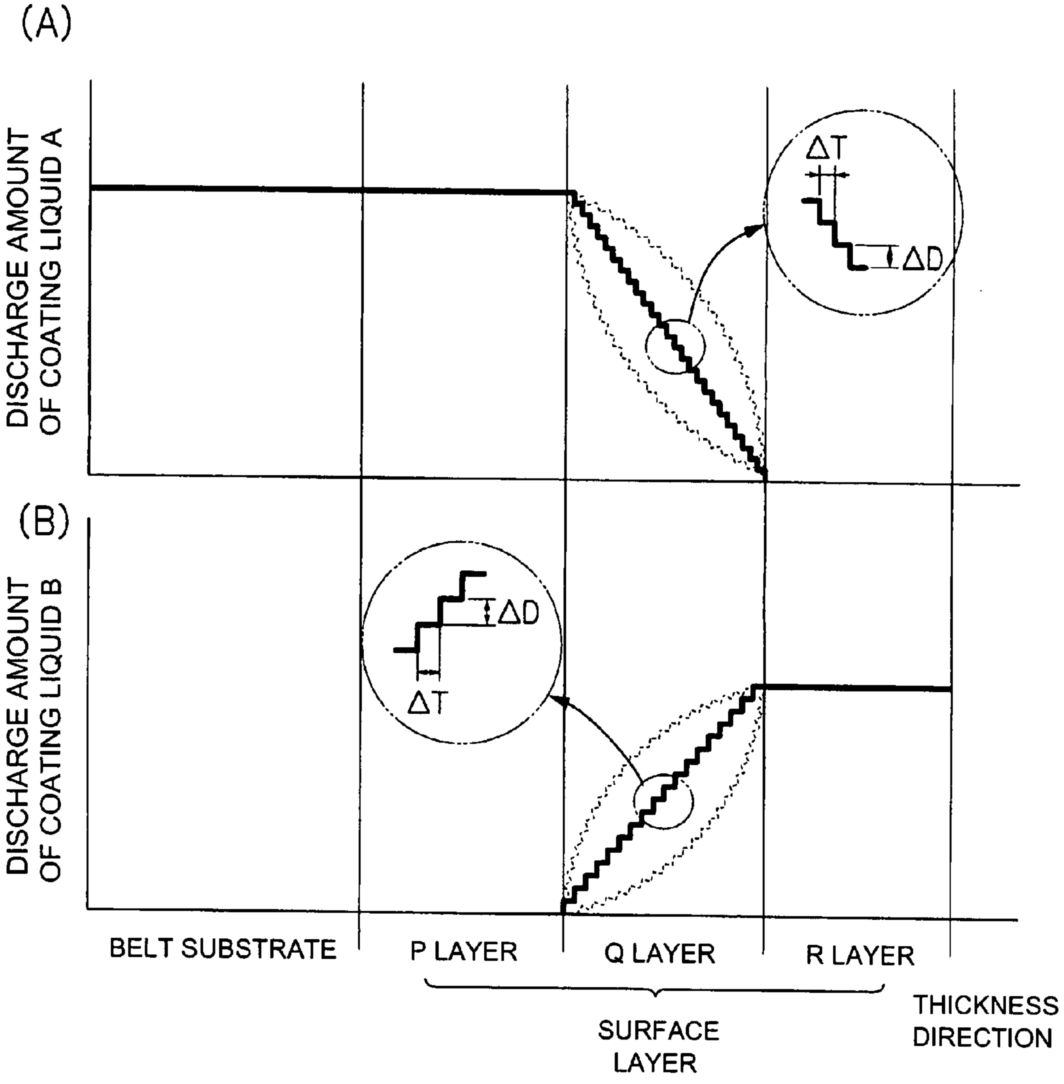
FIG. 6 is a view showing each discharge amount change of a first discharge head and a second discharge head.

Then, a process for manufacturing the endless belt 50 according to a first embodiment will be explained. Herein, FIG. 5 is a schematic construction view showing a coating apparatus for producing an endless belt according to a first embodiment. FIG. 6 is a view showing each discharge amount change of a first discharge head and a second discharge head. In FIG. 5, a main portion is indicated, and other constructions are omitted, and (A) is a top view, (B) is a front view, and (C) is a side view.

The endless belt 50 according to a first embodiment is manufactured, for example, as follows: herein, both of a composition A contained in a coating liquid A and a composition B contained in a coating liquid B to be used contain a resin material or a resin precursor and a conductive agent, and are different in constitution from each other. A viscosity of a coating liquid may be, for example, in a range of around 3 mPa·s to 300 mPa·s.

First, the coating liquid A containing the composition A is coated on a cylindrical mold to form a coating layer, and this is heated and dried at a prescribed temperature (when a polyimide resin precursor is used, imide conversion is performed by heating) to obtain a belt substrate 52.

Then, the belt substrate 52 is arranged on a coating apparatus 10. The coating apparatus 10, as shown in FIG. 5, is provided with, for example, a cylindrical holder 14 for holding the belt substrate 52 as a material to be coated, a first discharge head 12A for discharging droplets of the coating liquid A containing the composition A, and a second discharge head 12B for discharging droplets of the coating liquid B containing the composition B.

The first discharge head 12A and the second discharge head 12B are discharge heads having a length equivalent to or larger than a width (a length in an axial direction) of the belt substrate 52 which is a material to be coated, and are arranged so that a longitudinal direction thereof is parallel with a width direction (axial direction) of the belt substrate 52 (Herein, the "parallel" is not necessary to be strictly parallel, and the same is applied hereinafter). Arrangement is not limited to this parallel arrangement, but the heads may be arranged so that a longitudinal direction thereof is crossed with a width direction (axial direction) of the belt substrate 52.

In addition, the first discharge head 12A and the second discharge head 12B are arranged so that landing positions of discharged droplets on a material to be coated become the same. Of course, the first discharge head 12A and the second discharge head 12B may be arranged so that discharged droplets land on a material to be coated while they are collided and mixed before landing on a material to be coated, or may be arranged so that landing positions are different.

The first discharge head 12A and the second discharge head 12B may adopt any of a spraying system and an ink jet system, and an ink jet system, which may make droplets stably and precisely land on a prescribed region of a material to be coated, is optimal.

The discharge head of an ink jet system may be any of a continuous type by which a coating liquid is converted into droplets after continuous discharge through a nozzle having specified resolution which is manufactured by microprocessing, and an intermittent type (on-demand system) by which droplets of a coating liquid are discharged intermittently through a nozzle by a piezoelectric-element or a heat generating resistance element. When a coating liquid having a relatively-high viscosity is discharged, a continuous type discharge head is better.

It is possible to adjust resolution (dot number per 1 inch: dpi) of discharge of droplets so that after droplets have landed, they are spread to contact with adjacent droplets, finally resulting in uniform connection as a membrane, and coating may be performed in view of a surface tension of a material to be coated, a manner of spreading of droplets at landing, a size of droplets at discharge, and a solvent vaporizing rate due to a coating solvent concentration and a coating solvent species. These conditions are determined by, and may be adjusted by a material species of a coating liquid and a material constitution, and physical property of a surface of a material to be coated.

A discharge amount of a discharge head is determined, for example, by an aperture of a nozzle, a discharge pressure, a viscosity of a coating liquid, and a solid matter fraction of a coating liquid. For stably performing coating, an amount of the discharged coating liquid may be adjusted. And, increase and decrease of a discharge amount of a discharge head, for example, in the case of using a piezoelectric element, may be performed by adjusting a voltage frequency to be applied. This voltage frequency is, for example, in a range of 100 Hz to 10000 Hz. And, it is better that a discharge amount of droplets discharged from one nozzle of a discharge head is, for example, in a range of 1 pl to 500 pl.

In the coating apparatus 10 of this construction, after the belt substrate 52 is held by fitting on the holder 14, the holder is rotated by a driving apparatus not shown. And, the coating liquid A is discharged from a first discharge head 12A at a constant discharge amount (see FIG. 6), and droplets of the coating liquid A are discharged on the belt substrate 52 to form a P coating layer.

Subsequently, a discharge amount of the coating liquid A is reduced stepwise to 0 at a rate of a prescribed amount ΔD per each prescribed time ΔT while discharge of droplets of the coating liquid B from a second discharge head 12B is started, and a discharge amount of the coating liquid B is increased accordingly (see FIG. 6), thereby forming a Q coating layer.

At this time, increase and decrease in a discharge amount of the coating liquid are performed stepwise every time ΔT during which each coating liquid is landed on an entire coating surface of a material to be coated by one operation. Specifically, in the case of the present embodiment, a discharge amount of the coating liquid is increased or decreased stepwise at a rate of a prescribed amount ΔD per each time ΔT during which the belt substrate 52 as a material to be coated is rotated one time. Thereby, constitution in the coating layer at the same depth in a thickness direction becomes uniform. In addition, although in the present embodiment, an aspect where a discharge amount of the coating liquid is increased or decreased by a constant amount every prescribed time ΔT has been explained, a discharge amount which is increased or decreased in every prescribed time ΔT (prescribed amount ΔD) may be changed as shown with a dotted line in FIG. 6 (e.g. a discharged amount to be increased or decreased is increased by a constant amount every prescribed time, etc.).

Even when a discharge amount is increased or decreased stepwise like this, since droplets of the coating liquid are compatible with the surface already coated, a concentration gradient structure in which a composition is continuously changed in the thickness direction may be realized. In addition, although in the present embodiment, an aspect where each of the discharge amounts is increased or decreased at the same time has been explained, discharge amounts are not particularly limited as far as they are relatively changed.

Then, after a discharge amount of the coating liquid A is stopped (that is, after a discharge amount is made to be 0), discharge of the coating liquid B is continued at a constant discharge amount (see FIG. 6) to form an R coating layer.

In this way, a P coating layer, a Q coating layer and an R coating layer are sequentially formed. Although, for expression, steps of forming these coating layers were described separately, it is better that these formation steps are performed by a series of operations.

And, after formation of the P coating layer, the Q coating layer and the R coating layer, drying and optional heating are performed (for example, when a polyimide resin precursor or a polyamideimide resin precursor is used as a resin material, imide conversion is performed by heating) to form a surface layer 54 in which a P layer 54A, a Q layer 54B and an R layer 54C are sequentially laminated.

In this way, the endless belt 50 according to the present embodiment may be manufactured. Materials constituting the endless belt according to the present embodiment will be explained. The endless belt 50 is constructed of the belt substrate 52 and the surface layer 54, and both of them contain at least a resin material and a conductive agent (provided that a composition is different in each layer). Of course, the conductive agent may not be used.

Then, the resin material will be explained. Examples of the resin material include a polyimide resin, a polyamideimide resin, and a polycarbonate resin, inter alia, a polyimide resin or a polyamideimide resin may be used and, particularly, a polyimide resin may be used.

Examples of the precursor of the polyimide resin include a polyamic acid composition shown below. The polyamic acid composition contains, for example, a polymer including a polyamic acid structure, a coating solvent, and a tertiary amine as a catalyst. If necessary, an additive such as carboxylic anhydride may be contained. The composition is one example of the polyimide resin precursor, which is not limited thereto.

Each composition will be explained below.

(Polymer Including Polyamic Acid Structure)

The polymer including a polyamic acid structure is a polymer which may be a polyimide precursor, and examples include polyamic acid, and a polyamic acid-polyimide copolymer.

Examples of the polyamic acid include polyamic acid represented by the following formula (1). Examples of the polyamic acid-polyimide copolymer include a polyamic acid-polyimide copolymer represented by the following formula (2).

Formula (1)

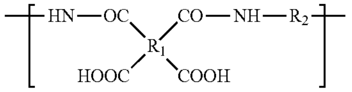

Formula (2)

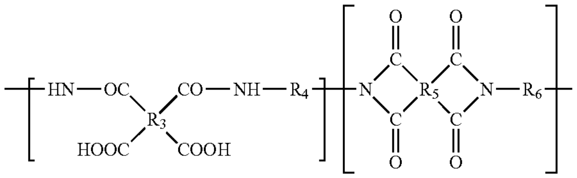

In the formula (1), $R_1$ represents a tetravalent organic group, and $R_2$ represents a divalent organic group. On the other hand, in the formula (2), $R_3$ represents a tetravalent organic group, $R_4$ represents a divalent organic group, $R_5$ represents a tetravalent organic group, and $R_6$ represents a divalent organic group.

Herein, divalent organic groups, $R_2$, $R_4$ and $R_6$ are represented as a residue structure obtained by removing two amino groups from a corresponding diamine compound. And, tetravalent organic groups, $R_1$, $R_3$ and $R_5$ are represented as a residue obtained by removing four carbonyl groups from a corresponding tetracarboxylic acid compound.

Polyamic acid, and a polyamic acid-polyimide copolymer will be explained in more detail below.

Polyamic acid is obtained by a polymerization reaction of tetracarboxylic dianhydride and a diamine compound at equivalent mole amounts in an organic polar solvent. The polyimide-polyamic acid copolymer is synthesized by a partial imidation reaction after polymerization of polyamic acid.

—Tetracarboxylic Dianhydride—

Tetracarboxylic dianhydride which may be used in producing polyamic acid is not particularly limited, but any of aromatic and aliphatic compounds may be used.

Examples of the aromatic tetracarboxylic acid include pyromellitic dianhydride, 3,3',4,4'-benzophenonetetracarboxylic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenylethertetracarboxylic dianhydride, 3,3',4,4'-dimethyldiphenylsilanetetracarboxylic dianhydride, 3,3',4,4,'-tetraphenylsilanetetracarboxylic dianhydride, 1,2,3,4-furantetracarboxylic dianhydride, 4,4'-bis(3,4-dicarboxyphenoxy)diphenyl sulfide dianhydride, 4,4'-bis(3,4-dicarboxyphenoxy)diphenyl sulfone dianhydride, 4,4'-bis(3,4-dicarboxyphenoxy)diphenylpropane dianhydride, 3,3',4,4'-perfluoroisopropylidenediphthalic dianhydride, 3,3',4,4'-biphenyltetracarboxylic dianhydride, bis(phthalic acid) phenylphosphine oxide dianhydride, p-phenylene-bis (triphenylphthalic acid) dianhydride, m-phenylene-bis (triphenylphthalic acid) dianhydride, bis(triphenylphthalic acid)-4,4'-diphenyl ether dianhydride, and bis(triphenylphthalic acid)-4,4'-diphenylmethane dianhydride.

Examples of the aliphatic tetracarboxylic dianhydride include aliphatic or alicyclic tetracarboxylic dianhydrides such as butanetetracarboxylic dianhydride, 1,2,3,4-cyclobutanetetracarboxylic dianhydride, 1,3-dimethyl-1,2,3,4-cyclobutanetetracarboxylic dianhydride, 1,2,3,4-cyclopentanetetracarboxylic dianhydride, 2,3,5-tricarboxylcyclopentylacetic dianhydride, 3,5,6-tricarboxynorbonane-2-acetic dianhydride, 2,3,4,5-tetrahydrofurantetracarboxylic dianhydride, 5-(2,5-dioxotetrahydrofural)-3-methyl-3-cyclohexene-1,2-dicarboxylic dianhydride, and bicycle[2,2,2]-oct-7-ene-2,3,5,6-tetracarboxylic dianhydride; aliphatic tetracarboxylic dianhydrides having an aromatic ring such as 1,3,3a,4,5,9b-hexahydro-2,5-dioxo-3-furanyl)-naphtho[1,2-c]furan-1-3-dione, 1,3,3a,4,5,9b-hexahydro-5-methyl-5-(tetrahydro-2,5-dioxo-3-furanyl)-naphtho[1,2-c]furan-1,3-dione, 1,3,3a,4,5,9b-hexahydro-8-methyl-5-(tetrahydro-2,5-dioxo-3-furanyl)-naphtho[1,2-c]furan-1,3-dione.

As the tetracarboxylic dianhydride, aromatic tetracarboxylic dianhydride may be used and, further, pyromellitic dianhydride, 3,3',4,4'-benzophenonetetracarboxylic dianhydride, and 3,3',4,4'-biphenylsulfonetetracarboxylic dianhydride may be used.

These tetracarboxylic dianhydrides may be used alone, or by combining two or more kinds.

—Diamine Compound—

Then, the diamine compound which may be used in producing polyamic acid is not particularly limited as far as it is a diamine compound having two amino groups in a molecular structure.

Examples include aromatic diamines such as p-phenylenediamine, m-phenylenediamine, 4,4'-diaminodiphenylmethane, 4,4'-diaminodiphenylethane, 4,4'-diaminodiphenyl ether, 4,4'-diaminodiphenyl sulfide, 4,4'-diaminodiphenysulfone, 1,5-diaminonaphthalene, 3,3'-dimethyl-4,4'-diaminobiphenyl, 5-amino-1-(4'-aminophenyl)-1,3,3-trimethylindane, 6-amino-1-(4'-aminophenyl)-1,3,3-trimethylindane, 4,4'-diaminobenzanilide, 3,5-diamino-3'-trifluoromethylbenzanilide, 3,5-diamino-4'-trifluoromethylbenzanilide, 3,4'-diaminodiphenyl ether, 2,7-diaminofluorene, 2,2-bis(4-aminophenyl)hexafluoropropane, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl)biphenyl, 2,2-bis[4-(4-aminophenoxy)phenyl] propane, 2,2-bis[4-(4-aminophenoxy)phenyl] hexafluoropropane, 1,4-bis(4-aminophenoxy)benzene, 4,4'-bis(4-aminophenoxy)biphenyl, 1,3'-bis(4-aminophenoxy) benzene, 9,9-bis(4-aminophenyl)fluorene, 4,4'-(p-phenyleneisopropylidene)bisaniline, 4,4'-(m-phenyleneisopropylidene)bisaniline, 2,2'-bis[4-(4-amino-2-trifluoromethylphenoxy)phenyl]hexafluoropropane, and 4,4'-bis[4-(4-amino-2-trifluoromethyl)phenoxy]-octafluorobiphenyl; aromatic diamines having two amino groups bound to an aromatic ring and a hetero atom other than a nitrogen atom of the amino groups, such as diaminotetraphenylthiophene; aliphatic diamines and alicyclic diamines such as 1,1-metaxylidenediamine, 1,3-propanediamine, tetramethylenediamine, pentamethylenediamine, octamethylenediamine, nonamethylenediamine, 4,4-diaminoheptamethylenediamine, 1,4-diaminocyclohexane, isophoronediamine, tetrahydrodicyclopentadienylenediamine, hexahydro-4,7-methanoindanylenedimethylenediamine, tricyclo[6,2,1,$0^{2,7}$]-undecylenedimethyldiamine, and 4,4'-methylenebis (cyclohexylamine).

As the diamine compound, p-phenylenediamine, 4,4'-diaminodiphenylmethane, 4,4'-diaminodiphenyl ether, 4,4,'-diaminodiphenyl sulfide, and 4,4'-diaminodiphenylsulfone may be used.

These diamine compounds may be used alone, or by combining two or more kinds.

—Combination of Tetracarboxylic Dianhydride and Diamine Compound—

As polyamic acid, those containing aromatic tetracarboxylic dianhydride and aromatic diamine may be used.

—Synthesis Solvent—

Examples of the organic polar solvent used in a reaction for producing this polyamic acid include sulfoxide solvents such as dimethyl sulfoxide, and diethyl sulfoxide, formamide solvents such as N,N-dimethylformamide, and N,N-diethylformamide, acetamide solvents such as N,N-dimethylacetamide, and N,N-diethylacetamide, pyrrolidone solvents such as N-methyl-2-pyrrolidone, and N-vinyl-2-pyrrolidone, phenol solvents such as phenol, o-, m- or p-cresol, xylenol, halogenated phenol, and catechol, ether solvents such as tetrahydrofuran, dioxane, and dioxolane, alcohol solvents such as methanol, ethanol, and butanol, cellosolves such as butyl cellosolve, hexamethylphosphoramide, and γ-butyrolactone, and it is possible that these are used alone, or as a mixture. Furthermore, aromatic hydrocarbons such as xylene, and toluene may be also used. The solvent is not particularly limited as far as it dissolves polyamic acid and the polyamic acid-polyimide copolymer.

—Solid Matter Concentration at Polymerization of Polyamic Acid—

A solid matter concentration of a polyamic acid solution is not particularly limited, but for example, may be 5% by weight to 50% by weight or 10% by weight to 30% by weight.

—Polyamic Acid Polymerization Temperature—

A reaction temperature at polyamic acid polymerization is, for example, in a range of 0° C. to 80° C.

—Imidation Reaction—

The polyamic acid-polyimide copolymer may be obtained by converting at least a part of a polyamic acid structure in polyamic acid into an imide group by a dehydration ring-closing reaction by the aforementioned method of imidating polyamic acid by heat treatment, or a chemical imidation method of acting a dehydrating agent and/or a catalyst.

A heating temperature in the method by heat treatment is, for example, usually 60° C. to 200° C., and may be 100° C. to 170° C.

On the other hand, in the chemical imidation method, the dehydrating agent and/or the catalyst is added to a polyamic acid solution to chemically progress an imidation reaction.

The dehydrating agent is not particularly limited as far as it is a monovalent carboxylic anhydride. For example, one or two or more kinds selected from acid anhydrides such as acetic anhydride, propionic anhydride, trifluoroacetic anhydride, butanoic anhydride and oxalic anhydride may be used. An amount of the dehydrating agent to be used may be 0.01 mole to 2 mole relative to 1 mole of a repetition unit of polyamic acid.

As the catalyst, for example, one or two or more kinds selected from tertiary amines such as pyridine, picoline, collidine, lutidine, quinoline, isoquinoline, and triethylamine may be used, but the catalyst is not limited thereto. An amount of the catalyst to be used may be 0.01 mole to 2 mole relative to 1 mole of the dehydrating agent used.

This chemical imidation reaction is performed by adding the dehydrating agent and/or the catalyst to the polyamic acid solution and, if necessary, heating this. A reaction temperature for dehydration ring-closing is usually 0° C. to 180° C., and may be 60° C. to 150° C.

When partially imidated, there is not particularly limitation, but a constitution ratio of an imidated structure and an unreacted amic acid structure may be 0/100 (mole/mole) to 80/20 (mole/mole). When a constitution ratio of an imide group and an amic acid group exceeds 80/20 (mole/mole), there is a possibility that the polyamic acid-polyimide copolymer is insolubilized.

Although the dehydrating agent and/or the catalyst which have been acted on the polyamic acid-polyimide copolymer may not be removed, they may be removed by the following method. As a method of removing the acted dehydrating agent and/or catalyst, a heating under reduced pressure method, or a re-precipitation method may be used. Heating under reduced pressure is performed under vacuum at a temperature of 80° C. to 120° C., and a tertiary amine used as the catalyst, the unreacted dehydrating agent, and hydrolyzed carboxylic acid are distilled off. And, the re-precipitation method is performed by using a poor solvent which dissolves the catalyst, the unreacted dehydrating agent and the hydrolyzed carboxylic acid, and does not dissolve the polyamic acid-polyimide copolymer, and adding a reaction solution to a large excessive amount of this poor solvent. The poor solvent is not particularly limited, but water, alcohol solvents such as methanol and ethanol, ketone solvents such as acetone and methyl ethyl ketone, and hydrocarbon solvents such as hexane may be used. The precipitated polyamic acid-polyimide copolymer is filtered and dried, and is dissolved again in a solvent such as γ-butyrolactone, and N-methyl-2-pyrrolidone.

A polymer including the polyamic acid structure may be used such that a solid matter concentration in the polyamic acid composition is 10% by weight or more, from a viewpoint that a desired thickness as a belt material is obtained. This solid matter concentration may be 15% by weight or more, and an upper limit thereof is 50% by weight.

(Coating Solvent)

Examples of the coating solvent include solfoxide solvents such as dimethyl sulfoxide, and diethyl sulfoxide, formamide solvents such as N,N-dimethylformamide, and N,N-diethylformamide, acetamide solvents such as N,N-dimethylacetamide, and N,N-diethylacetamide, pyrrolidone solvents such as N-methyl-2-pyrrolidone, and N-vinyl-2-pyrrolidone, phenol solvents such as phenol, o-, m- or p-cresol, xylenol, halogenated phenol, and catechol, ether solvents such as tetrahydrofuran, dioxane, and dioxolane, alcohol solvents such as methanol, ethanol, and butanol, cellosolve solvents such as butyl cellosolve, hexamethylphosphoramide, and γ-butyrolactone. It is possible that these are used alone, or as a mixture. Further, aromatic hydrocarbons such as xylene, and toluene may be also used. The solvent is not particularly limited as far as it dissolves the polyamic acid and the polyamic acid-polyimide copolymer.

The coating solvent may be added at the previous polyamic acid synthesis, or may be added by replacing with a prescribed solvent after polyamic acid polymerization. For replacing the solvent, any of a method of adding a prescribed amount of a solvent to a polyamic acid solution and diluting this, a method of re-dissolving a polymer in a prescribed solvent after re-precipitation of the polymer, and a method of adding a prescribed solvent while solvent is gradually distilled off to adjust a composition, may be used.

(Tertiary Amine)

The tertiary amine serves as a catalyst for an imidation reaction. For example, one or two or more kinds selected from pyridine, picoline, collidine, lutidine, quinoline, isoquinoline, and triethylamine may be used.

A content of the tertiary amine may be, for example, 0.1 to 30 parts by weight relative to 100 parts by weight of a resin matter in the polyamic acid composition.

(Carboxylic Anhydride)

The carboxylic anhydride serves as a dehydrating agent at an imidation reaction, and promotes the imidation reaction. Examples of the carboxylic anhydride include acetic anhydride, trifluoroacetic anhydride, propionic anhydride, butanoic anhydride and oxalic anhydride. Among them, acetic anhydride may be used. One or two or more kinds of them may be used.

A content of the carboxylic anhydride may be, for example, 0.1 part by weight to 30 parts by weight relative to 100 parts by weight of a resin matter in the polyamic acid composition.

Then, the conductive agent will be explained. As the conductive agent, a powder (a powder consisting of particles having a primary particle diameter of less than 10 μm may be used, or a powder consisting of particles having a primary particle diameter of 1 μm or less may be used) which is electrically conductive (e.g. volume resistivity is less than $10^7$ Ω·cm, the same is applied hereinafter) or electrically semi-conductive (e.g. volume resistivity is $10^7$ Ω·cm to $10^{13}$ Ω·cm, the same is applied hereinafter) may be used. The electrically conductive agent is not particularly limited as far as a desired electric resistance can be obtained, but examples include carbon black such as ketjen black, and acetylene black, metals such as aluminum and nickel, metal oxide compounds such as tin oxide, and potassium titanate. These may be used alone, or may be used jointly. Among them, acidic carbon black having a pH of 5 or less may be added.

—Acidic Carbon Black—

The acidic carbon black may be produced by imparting a carboxyl group, a quinone group, a lactone group, or a hydroxy group to a surface by oxidation-treating carbon black. This oxidation treatment may be performed by an air oxidation method of contacting carbon black with the air to react it under the high temperature (e.g. 300° C. to 800° C.) atmosphere, a method of reacting carbon black with nitrogen oxide or ozone under a normal temperature (e.g. 25° C., the same is applied hereinafter), or a method of oxidizing carbon black with the air under a high temperature (e.g. 300 to 800° C.), and oxidizing the carbon black with ozone under a low temperature (e.g. 20 to 200° C.).

Specifically, the acidic carbon black may be produced, for example, by a contact method. Examples of this contact method include a channel method, and a gas black method. Alternatively, the acidic carbon black may be also produced by a furnace black method using a gas or an oil as a raw material. If necessary, after these treatments, liquid phase oxidation treatment may be performed with nitric acid.

The acidic carbon black may be produced by a contact method, and is usually produced by a closed manner furnace method. By the furnace method, only carbon black having a high pH and a low volatile matter is usually produced, but by subjecting this to the liquid phase acid treatment, a pH may be adjusted. For this reason, the carbon black obtained by the furnace method which has been regulated by post-step treatment so as to have a pH of 5 or less, may be also applied.

A pH value of the acidic carbon black is, for example, 5.0 or less, and may be 4.5 or less, or 4.0 or less.

Herein, a pH is obtained by preparing an aqueous suspension of carbon black, followed by measurement with a glass electrode. And, a pH of the acidic carbon black may be adjusted under the condition such as a treatment temperature and a treatment time at an oxidation treating step.

The acidic carbon black may contain, for example, a volatile component in an amount of 1% by weight to 25% by weight, particularly 2% by weight to 20% by weight, more particularly 3.5% by weight to 15% by weight, in accordance with JIS K6211 (1982).

Specifically, examples of the acidic carbon black include "Printex 150T" (pH 4.5, volatile matter 10.0% by weight) manufactured by Degussa, "Special Black 350" (pH 3.5, volatile matter 2.2% by weight) manufactured by the same company, "Special Black 100" (pH 3.3, volatile matter 2.2% by weight) manufactured by the same company, "Special Black 250" (pH 3.1, volatile matter 2.0% by weight) manufactured by the same company, "Special Black 5" (pH 3.0, volatile matter 15.0% by weight) manufactured by the same company, "Special Black 4" (pH 3.0, volatile matter 14.0% by weight) manufactured by the same company, "Special Black 4A" (pH 3.0, volatile matter 14.0% by weight) manufactured by the same company, "Special Black 550" (pH 2.8, volatile matter 2.5% by weight) manufactured by the same company, "Special Black 6" (pH 2.5, volatile matter 18.0% by weight) manufactured by the same company, "Color Black FW200" (pH 2.5, volatile matter 20.0% by weight) manufactured by the same company, "Color Black FW2" (pH 2.5, volatile matter 16.5% by weight) manufactured by the same company, "Color Black FW2V" (pH 2.5, volatile matter 16.5% by weight) manufactured by the same company, "MONARCH1000" (pH 2.5, volatile matter 9.5% by weight) manufactured by Cabot, "MONARCH1300" (pH 2.5, volatile matter 9.5% by weight) manufactured by Cabot, "MONARCH1400" (pH 2.5, volatile matter 9.0% by weight) manufactured by Cabot, "MOGUL-L" (pH 2.5, volatile matter 5.0% by weight) manufactured by the same company, and "REGAL400R" (pH 4.0, volatile matter 3.5% by weight) by the same company.

—Addition Amount of Acidic Carbon Black—

The acidic carbon black may be increased in an addition amount as an electrically conductive powder.

A content of the acidic carbon black is, for example, 10% by weight to 30% by weight, more particularly 18% by weight to 30% by weight.

One example of a method of forming a resin layer (belt substrate, surface layer) using a polyamic acid composition as a precursor for the polyimide resin will be explained in detail below.

First, for example, the polyamic acid composition of the present invention is prepared as follows. First, a polyamic acid solution which is a precursor of a polyimide resin and which is obtained by polymerization-reacting a tetracarboxylic dianhydride component and a diamine component in an organic solvent is added to a poor solvent such as methanol to precipitate polyamic acid, whereby polyamic acid is re-precipitation-purified. Precipitated polyamic acid is filtered, and re-dissolved in a solvent such as γ-butyrolactone to obtain a polyamic acid solution.

To the polyamic acid solution are added a prescribed amount of tertiary amine, and if necessary, carboxylic anhydride, and this is stirred to dissolve the material, to obtain a polyamic acid composition.

Then, this solution is made to contain a conductive agent such as carbon black at a total of 5 parts by weight to 60 parts by weight relative to a dry weight of 100 parts by weight of a polyamic acid resin.

Herein, examples of a method of dispersing this conductive agent and pulverizing aggregates thereof include a physical procedure such as stirring with a mixer or a stirrer, a parallel roll, and ultrasound dispersion, and a chemical procedure such as introduction of a dispersant, but are not limited thereto.

Then, this solution is coated on a coating surface of a material to be coated, to form a coating layer. And, this coating layer is placed under the heating environment, to dry it in order to vaporize 30% by weight or more, particularly 50% by weight or more of a contained solvent. Drying is performed at a drying temperature, for example, in a range of 50° C. to 200° C.

Further, the coating layer is heated at 150° C. to 450° C. to progress an imide conversion reaction. A temperature for imidation is different depending on the kind of tetracarboxylic dianhydride and diamine as a raw material, or tertiary amine to be added, but the temperature may be set at a temperature at which imidation is completed.

In this way, a layer of a polyimide resin may be formed.

The endless belt according to the present embodiment which has been explained above, may be supplied to a variety of utilities such as an intermediate transfer belt, a transfer transport belt, a transport belt, and a fixing belt in an electrophotographic image forming apparatus such as an electrophotographic copying machine, a laser beam printer, a facsimile, and a composite apparatus thereof.

Although in the present embodiment, an aspect in which the belt substrate 52 and the surface layer 54 are both prepared by the composition including the resin material and the electrically conductive agent was explained, an aspect in which, in place of the surface layer 54, a releasing layer including a fluorine resin (e.g. polytetrafluoroethylene (PTFE), tetrafluoroethylene-perfluoroalkyl vinyl ether copolymer (PFA), tetrafluoroethylene-hexafluoropropylene copolymer (FEP) etc.) is provided, may be used. A thickness of a fluorine resin coating layer may be in a range of 2 μm to 30 μm. And, a conductive agent such as carbon black may be dispersed and contained in a releasing resin coating layer in order to improve durability and prevent charging. In the case of this aspect, for example, a layer having a concentration gradient structure of a composition including a resin material and a conductive agent, and a composition including a fluorine resin intervenes between the belt substrate and the releasing layer like the Q layer. An endless belt in which this releasing layer is formed on a circumferential surface of the belt substrate (provided that a conductive agent may not be contained therein) may be applied as a fixing belt in an electrophotographic image forming apparatus.

Although in the present embodiment, the endless belt 50 was constructed of the belt substrate 52 and the surface layer 54, the endless belt is not limited to this, but may be, for example, a belt constructed of the surface layer 54, that is, the P layer 54A, the Q layer 54B, and the R layer 54C.

Although in the present embodiment, an aspect using two kinds of different compositions was explained, an aspect is not limited to this, but may be an aspect using three or more kinds of different compositions. In addition, the layer construction is not limited to the above aspect, but a desired laminated construction may be adopted. Specifically, for example, the following layer constructions may be adopted. Hereinafter, "X-Y layer" means a layer having a concentration gradient structure in which a content ratio of a composition X relative to a composition Y is continuously decreased in a thickness direction, and a content ratio of the composition Y relative to the composition X is increased.

Composition A-composition B layer (single layer)

Composition A layer/composition A-composition B layer

Composition A-composition B layer/composition B layer

Composition A layer/composition A-composition B layer/composition B-composition C layer/composition C layer Herein, when three or more kinds of different compositions are used, a layer in which content ratios of three or more kinds of different compositions are mutually changed in a thickness direction, may be adopted.

In the present embodiment, an aspect in which a layer having a concentration gradient structure is applied to an endless belt was explained, but examples are not limited thereto. The layer may be applied to a functional membrane such as an electronic functional element and an optical functional element which are used in various electronic devices and various optical devices, and a process for producing the same.

In the case of this aspect, examples include a functional membrane utilized in optical devices such as optical sheets such as a linear polarizing plate, an elliptical light polarizing plate, a field angle extending film, and a light diffusion plate, which are used in various electronic devices such as a semiconductor element, a resister element and a heat producing element, a holographic optical element, an optical memory element, an optical waveguide, an optical irreversible circuit element, an optical branching element, an optical branching and connecting element, an optical switch element, and a liquid crystal display.

Second Embodiment

Figure 7:
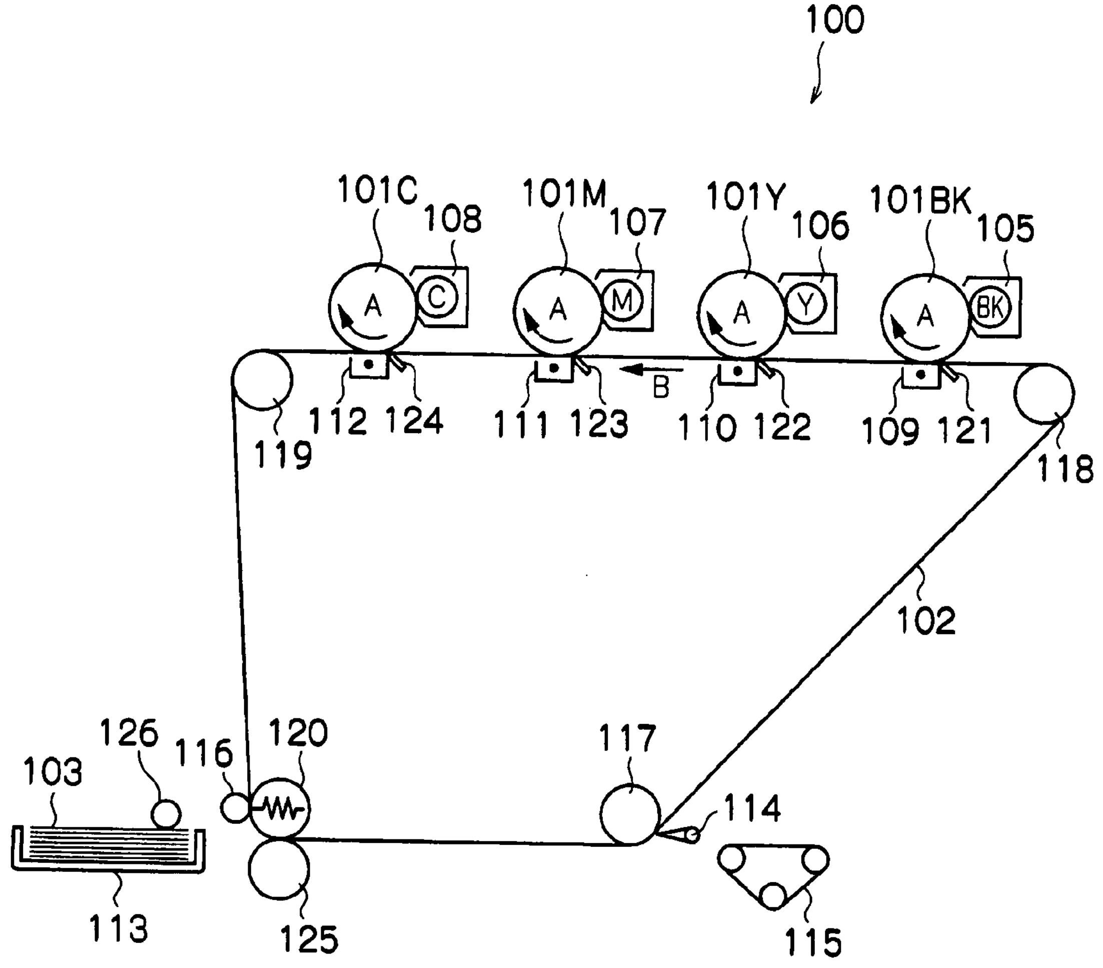
FIG. 7 is a schematic construction view showing an image forming apparatus according to a second embodiment.

FIG. 7 is a schematic construction view showing an image forming apparatus according to the second embodiment. The image forming apparatus according to the second embodiment is an aspect in which, as an intermediate transfer belt, the endless belt according to the first embodiment is applied.

The image forming apparatus 100 according to the second embodiment is provided with photoreceptor drums 101BK, 101Y, 101M and 101C as shown in FIG. 7, and accompanying with rotation in an arrow A direction, an electrostatic latent image depending on image information is formed on a surface thereof, by the well-known electrophotographic process (not shown).

And, at peripheries of photoreceptor drums 101BK, 101Y, 101M and 101C, developing devices 105 to 108 corresponding to each color of black (BK), yellow (Y), magenta (M), and cyan (C) are arranged, respectively, and electrostatic latent images formed on photoreceptor drums 101BK, 101Y, 101M and 101C are developed with respective developing devices 105 to 108 to form toner images. Therefore, for example, an electrostatic latent image written on the photoreceptor drum 101Y corresponds to image information of yellow, this electrostatic latent image is developed with the developing device 106 containing a toner for yellow (Y), and a yellow toner image is formed on the photoreceptor drum 101Y.

The intermediate transfer medium 102 is a belt-like intermediate transfer belt arranged so as to contact with surfaces of photoreceptor drums 101BK, 101Y, 101M and 101C, and is stretching-arranged on a plurality of rolls 117 to 120 to be rotated in an arrow B direction.

The already described polyimide endless belt according to the first embodiment is applied to the intermediate transfer medium 102.

Unfixed toner images formed on the photoreceptor drums 101BK, 101Y, 101M and 101C are sequentially transferred from photoreceptor drums 101BK, 101Y, 101M and 101C onto a surface of the intermediate transfer medium 102 so as to overlap respective colors, at respective primary transfer positions at which photoreceptor drums 101BK, 101Y, 101M and 101C and the intermediate transfer medium 102 are contacted.

At this primary transfer position, corona dischargers 109 to 112 in which charging on a contact region before transfer (transfer prenip) is prevented with shielding members 121 to 124 for preventing a transfer electric field from acting on an unnecessary region on the intermediate transfer medium 102 are arranged on a back side of the intermediate transfer medium 102 and, by applying a voltage having reverse polarity relative to charging polarity of a toner with corona dischargers 109 to 112, unfixed toner images on photoreceptor drums 101BK, 101Y, 101M and 101C are electrostatically attracted onto the intermediate transfer medium 102. This primary transfer unit is not limited to the corona discharger as far as it utilizes an electrostatic force, but may be an electrically conductive roll or an electrically conductive brush to which a voltage is applied.

The unfixed toner image which has been primarily transferred onto the intermediate transfer medium 102 in this way is transported to a secondary transfer position facing a transport passageway of a recording medium 103 accompanying with rotation of the intermediate transfer medium 102. At the secondary transfer position, a heating transfer roll 120 in which a heating source such as a ceramic heater and a halogen lamp is included, is contacted with a back side of the intermediate transfer medium 102. In addition, at the secondary transfer position, a press roll 125 is arranged opposite to the heating transfer roll 120. The press roll 125 may be such that a surface thereof is covered with a fluorine resin, and a heating source may be included like the heating transfer roll 120.

The recording medium 103 transported out from a paper supply part 113 with a feed roller 126 at prescribed timing is passed between this press roll 125 and the intermediate transfer medium 102. At this time, a voltage may be applied between the heating transfer roll 120 and the press roll 125. The unfixed toner image held by the intermediate transfer medium 102 is heat melting-transferred onto the recording medium 103 at the secondary transfer position.

And, the recording medium 103 onto which the unfixed toner image has been transferred is peeled from the intermediate transfer medium 102 with a peeling nail 114, and sent into a fixing device (not shown) with a transport belt 115, and the unfixed toner image is fixation-treated. At this time, the secondary transfer apparatus (heating transfer roll 120 and press roll 125) may perform fixation, but a fixation step may be independent as described above.

The press roll 125, the peeling nail 114 and a cleaning device 116 are arranged so that they are freely contacted with and isolated from the intermediate transfer medium 102, and these members are isolated from the intermediate transfer medium 102 until secondary transfer is performed.

A construction of the image forming apparatus according to the present embodiment is not limited to the above aspect, but for example, the apparatus may be an image forming apparatus provided with, if necessary, an image holder, a charging unit for charging a surface of the image holder, a light exposure unit for exposing the surface of the image holder to light to form an electrostatic latent image, a developing unit for developing the latent image formed on the surface of the image holder with developer to form a toner image, a transfer unit for transferring the toner image onto a material onto which a toner image is to be transferred, a fixation unit for fixing the toner image on the material, a cleaning unit for removing a toner and a dust attached to the image holder, and an charge removing unit for removing the electrostatic latent image remaining on the surface of the image holder, according to the known method.

In the image forming apparatus of this construction, as a transfer unit in a secondary transfer manner utilizing an intermediate transfer belt, or as a belt of a fixation unit in a belt manner utilizing a fixation belt, the endless belt according to the first embodiment may be applied depending on a construction thereof.

Herein, when the endless belt of the first embodiment is applied to a fixation belt in the fixation unit in a belt manner, in an image fixing apparatus which is provided, for example, with at least one or more driving members, an endless belt (fixing belt) rotatable with the one or more driving members, and a pressing member, and in which any one of the one or more driving members is arranged in contact with an inner circumferential surface of the endless belt, a pressure contacting part (nip part) is formed of the pressing member pressing an outer circumferential surface of the endless belt towards surfaces of the driving members, and a recording medium holding an unfixed toner image on a surface thereof is passed through the nip part while the medium is heated, whereby the unfixed toner image is fixed on a surface of the recording medium, an endless belt of the first embodiment may be used as the above endless belt.

The fixing unit may have other construction and function, if necessary, in addition to the above explained construction and function. For example, a lubricant may be coated on an inner circumferential surface of the endless belt, when using the endless belt. As the lubricant, the known liquid lubricant (e.g. silicone oil etc.) may be used. And, the lubricant may be continuously supplied via a felt provided in contact with an inner circumferential surface of the endless belt.

In addition, the fixation unit may be such that a pressure distribution in an endless belt axis direction in the nip part can be adjusted with the pressing member. For example, when the lubricant is used, by adjusting a pressure distribution, the existence state of the lubricant coated on an inner circumferential surface may be arbitrarily controlled, such as movement of the lubricant to one end of the endless belt, and concentration of the lubricant at a central part. Accordingly, for example, an extra lubricant may be concentrated to one end of the endless belt and recovered, or the lubricant may be moved to a central part of the endless belt, whereby pollution in the apparatus due to leakage of the lubricant from an end part of the endless belt may be prevented.

Such an adjustment of a pressure distribution is particularly useful when a lubricant is used and, at the same time, the aforementioned streak-like irregular roughness is imparted to an inner circumferential surface of the endless belt. In this case, by adjusting a pressure distribution at the nip part in view of a streak direction of the streak-like irregular roughness, control of the existence state of the lubricant coated on an inner circumferential surface becomes easier.

Third Embodiment

Figure 8:
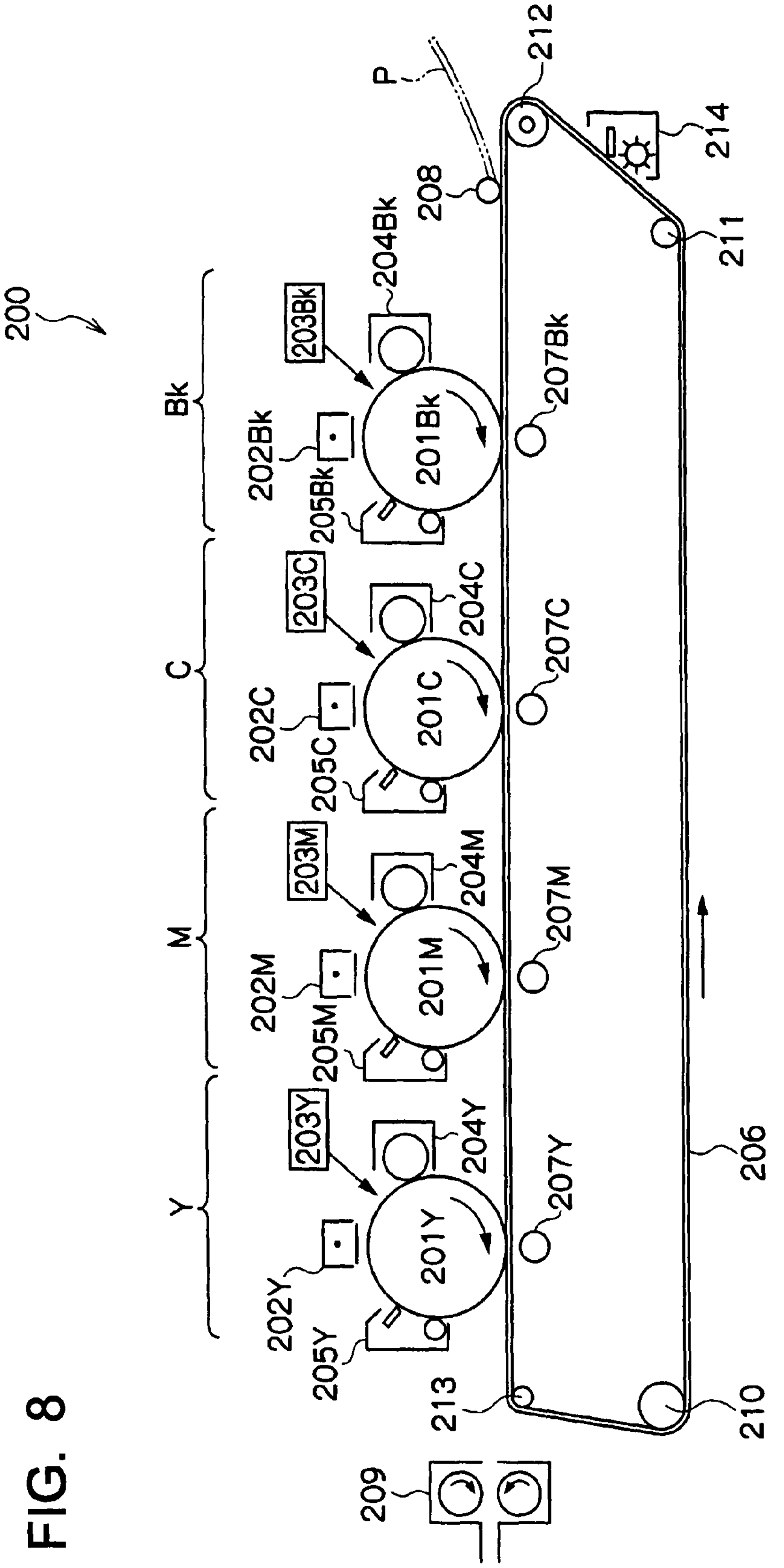
FIG. 8 is a schematic construction view showing an image forming apparatus according to a third embodiment.

FIG. 8 is a schematic construction view showing the image forming apparatus according to the third embodiment. The image forming apparatus according to the third embodiment is an aspect in which, as a transfer transport belt, the endless belt according to the first embodiment is applied.

The image forming apparatus 200 according to the third embodiment, as shown in FIG. 8, is provided with units 200Y, 200M, 200C and 200Bk, a recording paper (material onto which an image is to be transferred) transport belt (transfer transport belt) 206, transfer rolls 207Y, 207M, 207C and 207Bk, a recording paper transport roll 208, and a fixation unit 209. As this recording paper transport belt 206, the endless belt of the first embodiment is provided.

Units 200Y, 200M, 200C and 200Bk are provided with photoreceptor drums 201Y, 201M, 201C and 201Bk which are image holding bodies, respectively, and which can be rotated at a prescribed circumferential rate (process speed) in an arrow clockwise direction. At peripheries of photoreceptor drums 201Y, 201M, 201C and 201Bk, charging unit 202Y, 202M, 202C and 202Bk, light exposure units 203Y, 203M, 203C and 203Bk, respective color developing devices (yellow developing device 204Y, magenta developing device 204M, cyan developing device 204C, black developing device 204Bk), and photoreceptor cleaners 205Y, 205M, 205C, and 205Bk are arranged, respectively.

Four units 200Y, 200M, 200C and 200Bk are arranged in parallel with each other on the recording paper transport belt 206 in an order of units 200Y, 200M, 200C and 200B, but a proper order may be set in conformity with an image forming method, such as an order of units 200Bk, 200Y, 200C and 200M or the like.

The recording paper transport belt 206 can be rotated with support rolls 210, 211, 212 and 213 at the same circumferential rate as those of photoreceptor drums 201Y, 201M, 201C and 201Bk in an arrow counterclockwise direction, and a part of the belt positioned between support rolls 212 and 213 is arranged so as to contact with photoreceptor drums 201Y, 201M, 201C and 201Bk, respectively. The recording paper transport belt 206 is provided with the belt cleaning device 214.

Transfer rolls 207Y, 207M, 207C and 207Bk are arranged on an inner side of the recording paper transport belt 206, and at positions opposite to potions where the recording paper transport belt 206 is contacted with photoreceptor drums 201Y, 201M, 201C and 201Bk, respectively, and form transfer regions (nip parts) for transferring the toner image to the recording paper (material onto which an image is to be transferred) P, via the recording paper transport belt 206 and photoreceptor drums 201Y, 201M, 201C and 201Bk.

A fixation device 209 is arranged so that the recording paper P may be transported therein after it has passed through respective transfer regions (nip parts) between the recording paper transport belt 206 and photoreceptor drums 201Y, 201M, 201C and 201Bk.

The recording paper P is transported to the recording paper transport belt 206 with a recording paper transport roll 208.

In the unit 200Y, the photoreceptor drum 201Y is rotation-driven. Working together this, the charging unit 202Y is driven to charge a surface of the photoreceptor drum 201Y uniformly at a prescribed polarity and potential. The photoreceptor drum 201Y having the uniformly charged surface is then exposed to light imagewise with the light exposure unit 203Y, and an electrostatic latent image is formed on a surface thereof.

Subsequently, the electrostatic latent image is developed with the yellow developing device 204Y. Thereby, a toner image is formed on a surface of the photoreceptor drum 201Y. In this case, a toner may be a one-component or a two-component, and herein the toner is a two-component toner.

This toner image is passed through a transfer region (nip part) between the photoreceptor drum 201Y and the recording paper transport belt 206 and, at the same time, the recording paper P is transported to the transfer region (nip part) with the recording paper transport belt 206, and the toner image is transferred onto an external circumferential surface of the recording paper P with the electric field formed by transfer bias applied from the transfer roll 207Y.

Thereafter, the toner remaining on the photoreceptor drum 201Y is cleaned and removed with the photoreceptor drum cleaner 205Y. And, the photoreceptor drum 201Y is subjected to a next transfer cycle.

The above transfer cycle is performed similarly in units 200M, 200C and 200Bk.

The recording paper P to which the toner image has been transferred with transfer rolls 207Y, 207M, 207C and 207Bk is further transported to the fixing device 209, and fixation is performed. By the above operations, a desired image is formed on the recording paper.

Although in the third embodiment, a body to be transported such as the recording paper is transported using the endless belt in the first embodiment as the transfer transport belt, transportation is not limited to transporting of the recording paper, but the endless belt may be used for transporting a body to be transported other than the recording paper, for example, a medium made of a plastic (e.g. OHP sheet), a card and a plate.

Although in the above embodiment, an aspect in which the endless belt according to the first embodiment is applied to the belt member (intermediate transfer belt, transfer transport belt etc.) for the image forming apparatus was explained, but the invention is not limited thereto. For example, the endless belt may be also applied to a belt for transporting a body to be transported such as a sheet in a transport apparatus provided with the belt.

EXAMPLES

The present invention will be explained below using Examples, but the invention is not limited by these Examples at all.

—Preparation of Coating Liquid (A-1)—

Into 800 g of N-methyl-2-pyrrolidone (hereinafter, abbreviated as NMP) is added 81.00 g (404.6 mmol) of 4,4'-diaminodiphenyl ether (hereinafter, abbreviated as ODA) as a diamine compound, and this is dissolved while it is stirred at 25° C. Then, 119.00 g (404.6 mmol) of 3,3',4,4'-biphenyltetracarboxylic dianhydride (hereinafter, abbreviated as BPDA) as tetracarboxylic dianhydride is gradually added. After addition and dissolution of the tetracarboxylic dianhydride, the reaction solution is heated to a temperature of 60° C. and, thereafter, a polymerization reaction is performed for 20 hours while a reaction solution temperature is retained. The reaction solution is filtered with a #800 stainless mesh, and cooled to 25° C. to obtain a polyamic acid solution having a solution viscosity of 10 Pa·s (measured at a rotation rate of 60 rpm and 25° C. with E type viscometer (RE550L, manufactured by Toki Sangyo Co., Ltd.) using a standard cone rotor). Then, into 1000 g of the resulting polyamic acid solution is added and dissolved 10 g of polyvinyl-2-pyrrolidone (hereinafter, abbreviated as PVP), and 60 g of dried oxidation-treated carbon black (SPECIAL BLACK4: manufactured by Degussa, pH4.0, volatile matter: 14.0% by weight: hereinafter, abbreviated as CB) as a conductive agent is added gradually. The carbon black is dispersed in the polyamic acid solution by dispersion treatment with a ball mill at a temperature of 25° C. for 12 hours, and filtered with a #400 stainless mesh to obtain a carbon-dispersed polyamic acid solution having the following composition. The resulting carbon black-dispersed polyamic acid solution is used as a coating liquid (A-1).

Composition of coating liquid (A-1): polyamic acid (BPDA/ODA)/NMP/CB=200/800/60

—Preparation of Coating Liquid (A-2)—

Into 800 g of NMP is added 53.75 g (497.1 mmol) of 1,4-diaminobenzene (hereinafter, abbreviated as PDA) as a diamine compound, and this is dissolved while it is stirred at 25° C. Then, 146.25 g (497.1 mmol) of BPDA as tetracarboxylic dianhydride is added gradually. After addition and dissolution of tetracarboxylic dianhydride, the reaction solution is heated to a temperature of 60° C. and, thereafter, a polymerization reaction is performed for 20 hours while a reaction solution temperature is retained. The reaction solution is filtered with a #800 stainless mesh, and cooled to 25° C. to obtain a polyamic acid solution having a solution viscosity of 10 Pa·s (measured at a rotation rate of 60 rpm and 25° C. with E type viscometer (RE550L, manufactured by Toki Sangyo Co., Ltd.) using a standard cone rotor). Then, into 1000 g of the resulting polyamic acid solution is added and dissolved 10 g of PVP, and 60 g of dried oxidation-treated carbon black (CB) as a conductive agent is added gradually. The carbon black is dispersed in the polyamic acid solution by dispersion treatment with a ball mill at a temperature of 25° C. for 12 hours, and filtered with a #400 stainless mesh to obtain a carbon-dispersed polyamic acid solution having the following composition. The resulting carbon black-dispersed polyamic acid solution is used as a coating liquid (A-2).

Composition of coating liquid (A-2): polyamic acid (BPDA/PDA)/NMP/CB=200/800/60

—Preparation of Coating Liquid (A-3)—

Into 800 g of NMP is added 95.72 g (478.0 mmol) of ODA as a diamine compound, and this is dissolved while it is stirred at 25° C. Then, 104.28 g (478.0 mmol) of pyromellitic dianhydride (hereinafter, abbreviated as PMDA) as tetracarboxylic dianhydride is added gradually. After addition and dissolution of tetracarboxylic dianhydride, the reaction solution is heated to a temperature of 60° C. and, thereafter, a polymerization reaction is performed for 20 hours while a reaction solution temperature is retained. The reaction solution is filtered using a #800 stainless mesh, and cooled to 25° C. to obtain a polyamic acid solution having a solution viscosity of 10 Pa·s (measured at a rotation rate of 60 rpm and 25° C. with E type viscometer (RE550L, manufactured by Toki Sangyo Co., Ltd.) using a standard cone rotor). Then, into 1000 g of the resulting polyamic acid solution is added and dissolved 10 g of polyvinyl-2-pyrrolidone (PVP), and 60 g of dried oxidation-treated carbon black (CB) as a conductive agent is added gradually. The carbon black is dispersed in the polyamic acid solution by dispersion treatment with a ball mill at a temperature of 25° C. for 12 hours, and filtered with a #400 stainless mesh to obtain a carbon-dispersed polyamic acid solution having the following composition. The resulting carbon black-dispersed polyamic acid solution is used as a coating liquid (A-3).

Composition of coating liquid (A-3): polyamic acid (PMDA/ODA)/NMP/CB=200/800/60

—Preparation Coating Liquids (A-4) to (A-7)—

According to the same manner as that of the coating liquid (A-1) except that a blending amount of CB is changed to 0 to 50 g, coating liquids (A-4) to (A-7) are prepared.

Composition of coating liquid (A-4): polyamic acid (BPDA/ODA)/NMP/CB=200/800/0

Composition of coating liquid (A-5): polyamic acid (BPDA/ODA)/NMP/CB=200/800/20

Composition of coating liquid (A-6): polyamic acid (BPDA/ODA)/NMP/CB=200/800/40

Composition of coating liquid (A-7): polyamic acid (BPDA/ODA)/NMP/CB=200/800/50

—Preparation Coating Liquids (A-8) to (A-11)—

According to the same manner as that of the coating liquid (A-2) except that a blending amount of CB is changed to 0 to 50 g, coating liquids (A-8) to (A-11) are prepared.

Composition of coating liquid (A-8): polyamic acid (BPDA/PDA)/NMP/CB=200/800/0

Composition of coating liquid (A-9): polyamic acid (BPDA/PDA)/NMP/CB=200/800/20

Composition of coating liquid (A-10): polyamic acid (BPDA/PDA)/NMP/CB=200/800/40

Composition of coating liquid (A-11): polyamic acid (BPDA/PDA)/NMP/CB=200/800/50

—Preparation of Coating Liquids (A-12) to (A-15)—

According to the same manner as that of the coating liquid (A-2) except that a blending amount of CB is changed to 0 to 50 g, coating liquids (A-12) to (A-15) are prepared.

Composition of coating liquid (A-12): polyamic acid (PMDA/ODA)/NMP/CB=200/800/0

Composition of coating liquid (A-13): polyamic acid (PMDA/ODA)/NMP/CB=200/800/20

Composition of coating liquid (A-14): polyamic acid (PMDA/ODA)/NMP/CB=200/800/40

Composition of coating liquid (A-15): polyamic acid (PMDA/ODA)/NMP/CB=200/800/50

—Preparation of Coating Liquid (B-1)—

A coating liquid (B-1) is prepared by gradually adding 53.0 g of the coating liquid (A-1) to 950.0 g of NMP to dilute it.

Composition of coating liquid (B-1): polyamic acid (BPDA/ODA)/NMP/CB=10/990/3

—Preparation of Coating Liquids (B-2) to (B-15)—

According to the same manner as that of the coating liquid (B-1) except that, as a coating liquid, 53.0 g of (A-2), 53.0 g of (A-3), 50.0 g of (A-4), 51.0 g of (A-5), 52.0 g of (A-6), 52.5 g of (A-7), 50.0 g of (A-8), 51.0 g of (A-9), 52.0 g of (A-10), 52.5 g of (A-11), 50.0 g of (A-12), 51.0 g of (A-13), 52.0 g of (A-14), and 52.5 g of (A-15) are used, respectively, coating liquids (B-2) to (B-15) are obtained.

Composition of coating liquid (B-2): polyamic acid (BPDA/PDA)/NMP/CB=10/990/3 (a numerical value indicates part by weight; the same is applied hereinafter)

Composition of coating liquid (B-3): polyamic acid (PMDA/ODA)/NMP/CB=10/990/3

Composition of coating liquid (B-4): polyamic acid (BPDA/ODA)/NMP/CB=10/990/0

Composition of coating liquid (B-5): polyamic acid (BPDA/ODA)/NMP/CB=10/990/1

Composition of coating liquid (B-6): polyamic acid (BPDA/ODA)/NMP/CB=10/990/2

Composition of coating liquid (B-7): polyamic acid (BPDA/ODA)/NMP/CB=10/990/2.5

Composition of coating liquid (B-8): polyamic acid (BPDA/PDA)/NMP/CB=10/990/0

Composition of coating liquid (B-9): polyamic acid (BPDA/PDA)/NMP/CB=10/990/1

Composition of coating liquid (B-10): polyamic acid (BPDA/PDA)/NMP/CB=10/990/2

Composition of coating liquid (B-11): polyamic acid (BPDA/PDA)/NMP/CB=10/990/2.5

Composition of coating liquid (B-12): polyamic acid (PMDA/ODA)/NMP/CB=10/990/0

Composition of coating liquid (B-13): polyamic acid (PMDA/ODA)/NMP/CB=10/990/1

Composition of coating liquid (B-14): polyamic acid (PMDA/ODA)/NMP/CB=10/990/2

Composition of coating liquid (B-15): polyamic acid (PMDA/ODA)/NMP/CB=10/990/2.5

TABLE 1

| | | First coating liquid | | | | | | |
|---|---|---|---|---|---|---|---|---|
| | | A-1 | A-2 | A-3 | A-4 | A-5 | A-6 | A-7 |
| Polyamic acid | Kind | BPDA/ODA | BPDA/PDA | PMDA/ODA | BPDA/ODA | BPDA/ODA | BPDA/ODA | BPDA/ODA |
| | Part by weight | 200 | 200 | 200 | 200 | 200 | 200 | 200 |
| Solvent | Kind | NMP | NMP | NMP | NMP | NMP | NMP | NMP |
| | Part by weight | 800 | 800 | 800 | 800 | 800 | 800 | 800 |
| Conductive agent | Kind | CB | CB | CB | CB | CB | CB | CB |
| | Part by weight | 60 | 60 | 60 | 0 | 20 | 40 | 50 |
| Part by weight of conductive agent/100 parts by weight of polyamic acid | | 30 | 30 | 30 | 0 | 10 | 20 | 25 |
| Viscosity (Pas) | | 20 | 20 | 20 | 5 | 10 | 15 | 18 |

TABLE 2

| | | Coating liquid | | | | | | | |
|---|---|---|---|---|---|---|---|---|---|
| | | A-8 | A-9 | A-10 | A-11 | A-12 | A-13 | A-14 | A-15 |
| Polyamic acid | Kind | BPDA/PDA | BPDA/PDA | BPDA/PDA | BPDA/PDA | PMDA/ODA | PMDA/ODA | PMDA/ODA | PMDA/ODA |
| | Part by weight | 200 | 200 | 200 | 200 | 200 | 200 | 200 | 200 |
| Solvent | Kind | NMP | NMP | NMP | NMP | NMP | NMP | NMP | NMP |
| | Part by weight | 800 | 800 | 800 | 800 | 800 | 800 | 800 | 800 |

TABLE 2-continued

| | | Coating liquid | | | | | | | |
|---|---|---|---|---|---|---|---|---|---|
| | | A-8 | A-9 | A-10 | A-11 | A-12 | A-13 | A-14 | A-15 |
| Conductive agent | Kind | CB | CB | CB | CB | CB | CB | CB | CB |
| | Part by weight | 0 | 20 | 40 | 50 | 0 | 20 | 40 | 50 |
| Part by weight of conductive agent/100 parts by weight of polyamic acid | | 0 | 10 | 20 | 25 | 0 | 10 | 20 | 25 |
| Viscosity (Pas) | | 5 | 10 | 15 | 18 | 5 | 10 | 15 | 18 |

TABLE 3

| | | Coating liquid | | | | | | |
|---|---|---|---|---|---|---|---|---|
| | | B-1 | B-2 | B-3 | B-4 | B-5 | B-6 | B-7 |
| Polyamic acid | Kind | BPDA/ODA | BPDA/PDA | PMDA/ODA | BPDA/ODA | BPDA/ODA | BPDA/ODA | BPDA/ODA |
| | Part by weight | 10 | 10 | 10 | 10 | 10 | 10 | 10 |
| Solvent | Kind | NMP | NMP | NMP | NMP | NMP | NMP | NMP |
| | Part by weight | 990 | 990 | 990 | 990 | 990 | 990 | 990 |
| Conductive agent | Kind | CB | CB | CB | CB | CB | CB | CB |
| | Part by weight | 3 | 3 | 3 | 0 | 1 | 2 | 2.5 |
| Part by weight of conductive agent/100 parts by weight of polyamic acid | | 30 | 30 | 30 | 0 | 10 | 20 | 25 |
| Viscosity (mPas) | | 20 | 30 | 30 | 0 | 10 | 20 | 25 |

TABLE 4

| | | Coating liquid | | | | | | | |
|---|---|---|---|---|---|---|---|---|---|
| | | B-8 | B-9 | B-10 | B-11 | B-12 | B-13 | B-14 | B-15 |
| Polyamic acid | Kind | BPDA/PDA | BPDA/PDA | BPDA/PDA | BPDA/PDA | PMDA/ODA | PMDA/ODA | PMDA/ODA | PMDA/ODA |
| | Part by weight | 10 | 10 | 10 | 10 | 10 | 10 | 10 | 10 |
| Solvent | Kind | NMP | NMP | NMP | NMP | NMP | NMP | NMP | NMP |
| | Part by weight | 990 | 990 | 990 | 990 | 990 | 990 | 990 | 990 |
| Conductive agent | Kind | CB | CB | CB | CB | CB | CB | CB | CB |
| | Part by weight | 0 | 1 | 2 | 2.5 | 0 | 1 | 2 | 2.5 |
| Part by weight of conductive agent/100 parts by weight of polyamic acid | | 0 | 10 | 20 | 25 | 0 | 10 | 20 | 25 |
| Viscosity (mPas) | | 0 | 10 | 20 | 25 | 0 | 10 | 20 | 25 |

Abbreviations in the Tables are as follows:
BPDA: 3,3',4,4'-biphenyltetracarboxylic dianhydride
PMDA: pyromellitic dianhydride
ODA: 4,4'-diaminodiphenyl ether
PDA: 1,4-diaminobenzene
NMP: N-methyl-2-pyrrolidone
CB: carbon black (SPECIAL BLACK4: manufactured by Degussa, pH4.0, volatile matter: 14.0% by weight)

Example 1

Manufacturing of A/A-B Type: Polyimide Endless Belt (C-1)

A cylindrical mold made of a SUS material having an outer diameter of 90 mm and a length of 450 mm is prepared, and an outer surface thereof is coated with a silicone releasing agent, followed by drying treatment (releasing agent treatment). While the cylindrical mold which has been releasing agent-treated is rotated at a rate of 10 rpm in a circumferential direction, coating is performed by discharging the coating liquid (A-1) from a dispenser having an aperture of 1.0 mm from on an end of the cylindrical mold while a metal blade disposed on the mold is pressing at a constant pressure. By moving a dispenser unit at a constant rate (100 mm/min) in an axial direction of the cylindrical mold, the coating liquid is coated spirally on the cylindrical mold. After coating of the coating liquid, the blade is released, and the cylindrical mold is continued to be rotated for 2 minutes to perform leveling.

Thereafter, the mold and a coated material are drying-treated at 150° C. for 1 hour under the air atmosphere in a drying furnace while they are rotated at 10 rpm. After drying, a solvent is vaporized from the coated material to obtain a belt substrate (polyamic acid resin molded article) having self-supporting property.

An end of the resulting belt substrate is cut off, and a layer thickness thereof is measured, and is found to be 100 μm.

The resulting belt substrate is arranged on a coating apparatus shown in FIG. 5, coating using two kinds of coating liquids is performed under the conditions in Table 5 according to the first embodiment (providing that the R layer (R coating layer) is not formed) to form a coating layer which is to be a surface layer. Specifically, while the belt substrate is rotated at 60 rpm in a circumferential direction, coating is started at an initial discharge amount of 10 $\mu l/s \cdot \mu m^2$ of the coating liquid (B-1) from a first discharge head (nozzles are arranged in one row over 450 mm at a nozzle diameter of 0.11 mm, and a nozzle central interval of 0.5 mm pitch; continuous discharge at 565 Hz; expressed as nozzle A in the Table). Discharge from this first discharge head is performed for 3 seconds (a coating layer formed during this time is referred to as P coating layer) and, thereafter, a discharge amount is decreased stepwise at a rate of −0.5 $\mu l/s \cdot \mu m^2$ every one rotation of the belt substrate (every one second) (see FIG. 6). At the same time with starting of reduction in a discharge amount from this first discharge head, discharge of the coating liquid (B-2) from a second discharge head (nozzles are arranged in one row over 450 mm at a nozzle diameter of 0.1 mm, and a nozzle central interval of 0.5 mm pitch; continuous discharge at 565 Hz; expressed as nozzle B in the Table) is started, and a discharge amount is increased stepwise at a rate of from 0 to +0.5 $\mu l/s \cdot \mu m^2$ every one rotation of the belt substrate. Twenty seconds after reduction in a discharge amount from the first discharge head and starting of discharge from the second discharge head, a discharge amount from the nozzle A becomes 0 (see FIG. 6), and a discharge amount from the nozzle B becomes 10 $\mu l/s \cdot \mu m^2$ (a coating layer formed during this time is referred to as Q coating layer).

Then, while the holder (mold) is rotated, drying treatment is performed for 30 minutes under the condition of a temperature of 120° C. to dry each coating layer. After drying treatment, a film thickness is measured, and is fount to be 110 μm. Then, heat treatment is performed in a clean oven at 300° C. for 30 minutes to progress an imidatation reaction. Thereafter, this is allowed to cool, and a belt is removed from the holder (mold) to obtain an objective polyimide endless belt (C-1).

—Evaluation—

Regarding the resulting polyimide endless belt, various tests are performed by the following methods. Results are shown in Table 6.

(Measurement of Film Thickness)

For measuring a film thickness of the belt, an eddy current film thickness meter CTR-1500E manufactured by Sanko Electronics is used, measurement is performed five times on the same sample, and an average is adopted as a belt film thickness.

Surface Resistivity and Volume Resistivity

A resistance value of the resulting each polyimide endless belt is measured. That is, using a circular electrode (UR prove of Hirester IP manufactured by Mitsubishi Chemical Co., Ltd.: pillar electrode outer diameter Φ16 mm, ring-like electrode part inner diameter 30 mm, outer diameter 40 mm), in accordance with JIS K6911 (1995), under the 22° C./55% RH environment, a voltage of 100V is applied and a current value after 10 seconds is measured, and a surface resistivity and a volume resistivity are determined from the current value.

Measurement of Folding Endurance

A test piece of 150 mm×15 mm is prepared from the resulting polyimide belt. A belt film thickness is adjusted to 80 μm by appropriately controlling conditions at coating.

According to JIS C5016 (1994), reciprocating bending times until breakage of the test piece is measured. Measurement is performed ten times on the same sample, and an average value is adopted as the result of evaluation of folding endurance. This is adopted as measurement data. As a measuring machine, a crumpling fatigue resistance testing machine MIT-DA manufactured by Toyo Seiki Seisaku-sho, Ltd. is used.

Printing Image Quality (Copy Image Quality)

Using a DocuCentre Color2200 modified machine manufactured by Fuji Xerox Co., Ltd. (modified to process rate: 250 mm/sec, primary transfer current: 35 μA), the endless belt manufactured in Example 1 is provided as an intermediate transfer belt, a 50% half tone of Cyan and Magenta is outputted on a C2 paper manufactured by Fuji Xerox Co., Ltd under high temperature and high humidity (28° C. 85% RH) and low temperature and low humidity (10° C. 15% RH), and density unevenness and a spot defect are visually evaluated based on the following criteria.

Density Unevenness

A printed potion of a $10^{th}$ printed sample is equally divided into 3×3=9, each chromaticity of each equal part is measured using a color chromaticity meter CR-210 (manufactured by KONICA MINOLTA HOLDINGS, INC.), and a color difference E which is a difference between maximum chromaticity and minimum chromaticity is obtained.

A: A color difference ΔE is less than 0.3, and density unevenness is not confirmed.

B: A color difference ΔE is 0.3 or more but less than 0.5.

C: A color difference ΔE is 0.5 or more but less than 1.0.

D: A color difference ΔE is 1.0 or more.

Spot Defect

A $10^{th}$ printed sample is visually observed within a printed potion thereof.

A: The number of spots having a size of less than 0.5 mm is less than 10.

B: The number of spots having a size of less than 0.5 mm is 10 or more but less than 50.

C: The number of spots having a size of less than 0.5 mm is 50 or more but less than 100. Or, the number of spots having a size of 0.5 mm or more but less than 1.0 mm is less than 50.

D: The number of spots having a size of less than 0.5 mm is 100 or more, or the number of spots having a size of 0.5 mm or more but less than 1.0 mm is 50 or more, or the number of spots having a size of 1.0 mm or more is 1 or more.

Regarding a film thickness, a surface resistivity, a volume resistivity, and folding endurance, the properties (Δ (after paper passage-initial)) after a 1000 papers passage (after formation of 30% half tone image) is also evaluated.

Examples 2 to 8

According to the same manner as that of Example 1 except that the kind and the discharge amount of the coating liquid are changed according to Table 5, polyimide endless belts (C-2) to (C-8) are manufactured. Properties and evaluation results of the resulting polyimide endless belts are shown in Table 6.

Example 9

Manufacturing of A/A-B/B Type Polyimide Endless Belt (C-9)

A cylindrical mold made of a SUS material having an outer diameter of 90 mm and a length of 450 mm is prepared, and an outer surface thereof is coated with a silicone releasing agent, followed by drying treatment (releasing agent treatment). While the cylindrical mold which has been releasing agent-treated is rotated at a rate of 10 rpm in a circumferential direction, coating is performed by discharging the coating liquid (A-1) from a dispenser having an aperture of 1.0 mm from on an end of the cylindrical mold while a metal blade disposed on the mold is pressing at a constant pressure. By moving a dispenser unit at a constant rate (100 mm/min) in an axial direction of the cylindrical mold, the coating liquid is coated spirally on the cylindrical mold. After coating of the first coating liquid, the blade is released, and the cylindrical mold is continued to be rotated for 2 minutes to perform leveling.

Thereafter, the mold and a coated material are drying-treated at 150° C. for 1 hour under the air atmosphere in a drying furnace while they are rotated at 10 rpm. After drying, a solvent is vaporized from the coated material to obtain a belt substrate in which the coated material has self-supporting property.

An end of the resulting belt substrate is cut off, and a layer thickness thereof is measured, and is found to be 100 μm.

The resulting belt substrate is arranged on a coating apparatus shown in FIG. 5, coating using two kinds of coating liquids is performed under the conditions in Table 7 according to the first embodiment to form a coating layer which is to be a surface layer. Specifically, while the belt substrate is rotated at 60 rpm in a circumferential direction, coating is started at an initial discharge amount of 10 $\mu l/s \cdot \mu m^2$ of the coating liquid (B-1) from a first discharge head (nozzles are arranged in one row over 450 mm at a nozzle diameter of 0.1 mm, and a nozzle central interval of 0.5 mm pitch; continuous discharge at 565 Hz; expressed as nozzle A in the Table). Discharge from this first discharge head is performed for 3 seconds (a coating layer formed during this time is referred to as P coating layer) and, thereafter, a discharge amount is decreased stepwise at a rate of −0.5 $\mu l/s \cdot \mu m^2$ every one rotation of the belt substrate (every one second) (see FIG. 6). At the same time with starting of reduction in a discharge amount from this first discharge head, discharge of the coating liquid (B-2) from a second discharge head (nozzles are arranged in one row over 450 mm at a nozzle diameter of 0.1 mm, and a nozzle central interval of 0.5 mm pitch; continuous discharge at 565 Hz; expressed as nozzle B in the Table) is started, and a discharge amount is increased stepwise at a rate of from 0 to +0.5 $\mu l/s \cdot \mu m^2$ every one rotation of the belt substrate (every one second). Twenty seconds after reduction in a discharge amount from the first discharge head and starting of discharge from the second discharge head, a discharge amount from the nozzle A becomes 0 (see FIG. 6), and a discharge amount from the nozzle B becomes 10 $\mu l/s \cdot m^2$ (a coating layer formed during this time is referred to as Q coating layer). Thereafter, coating is performed for 3 seconds at a discharge amount of 10 $\mu l/s \cdot \mu m^2$ from the second discharge head (a coating layer formed during this time is referred to as R coating layer).

Then, while the holder (mold) is rotated, drying treatment is performed for 30 minutes under the condition of a temperature of 120° C. to dry each coating layer. After drying treatment, a film thickness is measured, and is fount to be 110 μm. Then, heat treatment is performed in a clean oven at 300° C. for 30 minutes to progress an imidatation reaction. Thereafter, this is allowed to cool at room temperature, and a belt is removed from the holder (mold) to obtain an objective polyimide endless belt (C-9).

Examples 10 to 16

According to the same manner as that of Example 9 except that the kind and the discharge amount of the coating liquid are changed according to Table 7, polyimide endless belts (C-10) to (C-16) are manufactured. Properties and evaluation results of the resulting polyimide endless belts are shown in Table 8.

Comparative Example 1

Monolayer Endless Belt

A cylindrical mold made of a SUS material having an outer diameter of 90 mm and a length of 450 mm is prepared, and an outer surface thereof is coated with a silicone releasing agent, followed by drying treatment (releasing agent treatment). While the cylindrical mold which has been releasing agent-treated is rotated at a rate of 10 rpm in a circumferential direction, coating is performed by discharging the coating liquid (A-1) from a dispenser having an aperture of 1.0 mm from on an end of the cylindrical mold while a metal blade disposed on the mold is pressing at a constant pressure. By moving a dispenser unit at a constant rate (100 mm/min) in an axial direction of the cylindrical mold, the coating liquid is coated spirally on the cylindrical mold. After coating of the coating liquid, the blade is released, and the cylindrical mold is continued to be rotated for 2 minutes to perform leveling.

Thereafter, the mold and a coated material are drying-treated at 150° C. for 1 hour under the air atmosphere in a drying furnace while they are rotated at 10 rpm. After drying, a solvent is vaporized from the coated material, whereby the coated material is changed into a polyamic acid resin molded article having self-supporting property.

Then, heat treatment is performed in a clean oven at 300° C. for 30 minutes to progress an imidatation reaction. Thereafter, the mold is allowed to cool, and the resin is removed from the mold to obtain an objective polyimide endless belt (D-1).

The resulting polyimide endless belt is subjected to various tests by the methods shown in Examples. Results are shown in Table 9.

Comparative Examples 2 to 3

Monolayer Endless Belt

According to the same manner as that of Comparative Example 1 except that the kind of the coating liquid is changed according to Table 9, polyimide endless belts (D-2) to (D-3) are manufactured. The resulting polyimide endless belts are subjected to tests similarly. Results are shown in Table 9.

Comparative Example 4

Simple Laminated Endless Belt

A cylindrical mold made of a SUS material having an outer diameter of 90 mm and a length of 450 mm is prepared, and an outer surface thereof is coated with a silicone releasing agent, followed by drying treatment (releasing agent treatment). While the cylindrical mold which has been releasing agent-treated is rotated at a rate of 10 rpm in a circumferential direction, coating is performed by discharging the coating liquid (A-1) from a dispenser having an aperture of 1.0 mm from on an end of the cylindrical mold while a metal blade disposed on the mold is pressing at a constant pressure. By moving a dispenser unit at a constant rate (100 mm/min) in an axial direction of the cylindrical mold, the coating liquid is coated spirally on the cylindrical mold. After coating of the coating liquid, the blade is released, and the cylindrical mold is continued to be rotated for 2 minutes to perform leveling.

Thereafter, the mold and a coated material are drying-treated at 150° C. for 1 hour under the air atmosphere in a drying furnace while they are rotated at 10 rpm. After drying, a solvent is vaporized from the coated material to obtain a belt substrate having self-supporting property.

The resulting belt substrate is subjected to coating using one kind of the coating liquid to form a coating layer which is to be a surface layer. Specifically, while the belt substrate is rotated at 10 rpm in a circumferential direction, coating is performed for 23 seconds by discharging the coating liquid (B-1) from the first discharge head (expressed as nozzle A in the Table) at a discharge amount of 10 μl/s·μm$^2$, to form a coating layer which is to be a surface layer.

Then, while the holder (mold) is rotated, drying treatment is performed for 30 minutes under the condition of a temperature of 120° C. to dry the belt. After drying treatment, a belt film thickness is measured, and found to be 110 μm. Then, heat treatment is performed in a clean oven at 300° C. for 30 minutes to proceed an imidation reaction. Thereafter, the holder (mold) is allowed to cool, and the resin is removed from the mold to obtain an objective polyimide endless belt (D-4).

The resulting polyimide endless belt is subjected to various tests as in Example 1. Results are shown in Table 9.

Comparative Examples 5 to 9

Simple Laminated Endless Belt

According to the same manner as that of Comparative Example 4 except that the kind of the coating liquid is changed according to Table 9, polyimide endless belts (D-5) to (D-10) are manufactured. The resulting polyimide endless belts are subjected to tests similarly. Results are shown in Table 9.

TABLE 5

| | | | | Example | | | | | | | |
|---|---|---|---|---|---|---|---|---|---|---|---|
| | | | | Example 1 | Example 2 | Example 3 | Example 4 | Example 5 | Example 6 | Example 7 | Example 8 |
| | Layer construction | | | A/A-B | A/A-B | A/A-B | A/A-B | A/A-B | A/A-B | A/A-B | A/A-B |
| | Polyimide endless belt | | | C-1 | C-2 | C-3 | C-4 | C-5 | C-6 | C-7 | C-8 |
| Belt substrate | Coating liquid used | | | A-1 | A-1 | A-1 | A-1 | A-1 | A-1 | A-2 | A-3 |
| | Film thickness after drying (substrate layer)μm | | | 100 | 100 | 100 | 100 | 100 | 100 | 100 | 100 |
| Surface layer | P coating layer | Nozzle A | Coating liquid used | B-1 | B-1 | B-1 | B-1 | B-1 | B-1 | B-2 | B-3 |
| | | | Initial discharge amount μl/s · μm$^2$ | 10 | 10 | 10 | 10 | 10 | 10 | 10 | 10 |
| | | | Discharge time | 3 seconds | 3 seconds | 3 seconds | 3 seconds | 3 seconds | 3 seconds | 3 seconds | 3 seconds |
| | Q coating layer | Nozzle A | Coating liquid used | B-1 | B-1 | B-1 | B-1 | B-1 | B-1 | B-2 | B-3 |
| | | | Change in discharge amount μl/s · μm$^2$ | 10→0 | 10→0 | 10→0 | 10→0 | 10→0 | 10→0 | 10→0 | 10→0 |
| | | | Rate of change in discharge amount μl/s · μm$^2$ | −0.5 | −0.5 | −0.5 | −0.5 | −0.5 | −0.5 | −0.5 | −0.5 |
| | | Nozzle B | Coating liquid used | B-2 | B-3 | B-4 | B-5 | B-6 | B-7 | B-1 | B-1 |
| | | | Change in discharge amount μl/s · μm$^2$ | 0→10 | 0→10 | 0→10 | 0→10 | 0→10 | 0→10 | 0→10 | 0→10 |
| | | | Rate of change in discharge amount μl/s · μm$^2$ | +0.5 | +0.5 | +0.5 | +0.5 | +0.5 | +0.5 | +0.5 | +0.5 |
| | | | Discharge time | 20 seconds | 20 seconds | 20 seconds | 20 seconds | 20 seconds | 20 seconds | 20 seconds | 20 seconds |
| | R coating layer | Nozzle B | Coating liquid used | — | — | — | — | — | — | — | — |
| | | | Initial discharge amount μl/s · μm$^2$ | — | — | — | — | — | — | — | — |
| | | | Discharge time | — | — | — | — | — | — | — | — |
| | Film thickness after drying (substrate + surface layer) μm | | | 110 | 110 | 110 | 110 | 110 | 110 | 110 | 110 |

In the Table, "—" shows not formed.

TABLE 6

| | | | Example 1 | Example 2 | Example 3 | Example 4 | Example 5 | Example 6 | Example 7 | Example 8 |
|---|---|---|---|---|---|---|---|---|---|---|
| Initial property | Film thickness μm | | 100 | 100 | 100 | 100 | 100 | 100 | 100 | 100 |
| | Surface resistivity (logΩ/□) | | 10 | 10 | 15 | 12 | 11 | 10.5 | 10 | 10 |
| | Volume resistivity (logΩ · cm) | | 10 | 10 | 15 | 12 | 11 | 10.5 | 10 | 10 |
| | Folding endurance times | | 5000 | 5000 | 5000 | 5000 | 5000 | 5000 | 5000 | 5000 |
| | Printed image quality | Density unevenness | A | A | A | A | A | A | A | A |
| | | Spot defect | A | A | A | A | A | A | A | A |
| Property after paper passage test | Film thickness μm | | 100 | 100 | 100 | 100 | 100 | 100 | 100 | 100 |
| | Δ (after paper passage - initial) | | 0 | 0 | 0 | 0 | 0 | 0 | 0 | 0 |
| | Surface resistivity (logΩ/□) | | 10 | 10 | 15 | 12 | 11 | 10.5 | 10 | 10 |
| | Δ (after paper passage - initial) | | 0 | 0 | 0 | 0 | 0 | 0 | 0 | 0 |

TABLE 6-continued

| | Example 1 | Example 2 | Example 3 | Example 4 | Example 5 | Example 6 | Example 7 | Example 8 |
|---|---|---|---|---|---|---|---|---|
| Volume resistivity (logΩ · cm) | 10 | 10 | 15 | 12 | 11 | 10.5 | 10 | 10 |
| Δ (after paper passage - initial) | 0 | 0 | 0 | 0 | 0 | 0 | 0 | 0 |
| Folding endurance times | 5000 | 5000 | 5000 | 5000 | 5000 | 5000 | 5000 | 5000 |
| Δ (after paper passage - initial) | 0 | 0 | 0 | 0 | 0 | 0 | 0 | 0 |

TABLE 7

| | | | | Example | | | | | | | |
|---|---|---|---|---|---|---|---|---|---|---|---|
| | | | | Example 9 | Example 10 | Example 11 | Example 12 | Example 13 | Example 14 | Example 15 | Example 16 |
| | Layer construction | | | A/A-B/B | A/A-B/B | A/A-B/B | A/A-B/B | A/A-B/B | A/A-B/B | A/A-B/B | A/A-B/B |
| | Polyimide endless belt | | | C-9 | C-10 | C-11 | C-12 | C-13 | C-14 | C-15 | C-16 |
| Belt substrate | Coating liquid used | | | A-1 | A-1 | A-1 | A-1 | A-1 | A-1 | A-2 | A-3 |
| | Film thickness after drying (substrate layer)μm | | | 100 | 100 | 100 | 100 | 100 | 100 | 100 | 100 |
| Surface layer | P coating layer | Nozzle A | Coating liquid used | B-1 | B-1 | B-1 | B-1 | B-1 | B-1 | B-2 | B-3 |
| | | | Initial discharge amount μl/s · μm$^2$ | 10 | 10 | 10 | 10 | 10 | 10 | 10 | 10 |
| | | | Discharge time | 3 seconds | 3 seconds | 3 seconds | 3 seconds | 3 seconds | 3 seconds | 3 seconds | 3 seconds |
| | Q coating layer | Nozzle A | Coating liquid used | B-1 | B-1 | B-1 | B-1 | B-1 | B-1 | B-2 | B-3 |
| | | | Change in discharge amount μl/s · μm$^2$ | 10→0 | 10→0 | 10→0 | 10→0 | 10→0 | 10→0 | 10→0 | 10→0 |
| | | | Rate of change in discharge amount μl/s · μm$^2$ | −0.5 | −0.5 | −0.5 | −0.5 | −0.5 | −0.5 | −0.5 | −0.5 |
| | | Nozzle B | Coating liquid used | B-2 | B-3 | B-4 | B-5 | B-6 | B-7 | B-1 | B-1 |
| | | | Change in discharge amount μl/s · μm$^2$ | 0→10 | 0→10 | 0→10 | 0→10 | 0→10 | 0→10 | 0→10 | 0→10 |
| | | | Rate of change in discharge amount μl/s · μm$^2$ | +0.5 | +0.5 | +0.5 | +0.5 | +0.5 | +0.5 | +0.5 | +0.5 |
| | | | Discharge time | 20 seconds | 20 seconds | 20 seconds | 20 seconds | 20 seconds | 20 seconds | 20 seconds | 20 seconds |
| | R coating layer | Nozzle B | Coating liquid used | B-2 | B-3 | B-4 | B-5 | B-6 | B-7 | B-1 | B-1 |
| | | | Initial discharge amount μl/s · μm$^2$ | 10 | 10 | 10 | 10 | 10 | 10 | 10 | 10 |
| | | | Discharge time | 3 seconds | 3 seconds | 3 seconds | 3 seconds | 3 seconds | 3 seconds | 3 seconds | 3 seconds |
| | Film thickness after drying (substrate + surface layer) μm | | | 110 | 110 | 110 | 110 | 110 | 110 | 110 | 110 |

TABLE 8

| | | | Example 9 | Example 10 | Example 11 | Example 12 | Example 13 | Example 14 | Example 15 | Example 16 |
|---|---|---|---|---|---|---|---|---|---|---|
| Initial property | Film thickness μm | | 100 | 100 | 100 | 100 | 100 | 100 | 100 | 100 |
| | Surface resistivity (logΩ/□) | | 10 | 10 | 15 | 12 | 11 | 10.5 | 10 | 10 |
| | Volume resistivity (logΩ · cm) | | 10 | 10 | 15 | 12 | 11 | 10.5 | 10 | 10 |
| | Folding endurance times | | 5000 | 5000 | 5000 | 5000 | 5000 | 5000 | 5000 | 5000 |
| | Printed image quality | Density unevenness | A | A | A | A | A | A | A | A |
| | | Spot defect | A | A | A | A | A | A | A | A |
| Property after paper passage test | Film thickness μm | | 100 | 100 | 100 | 100 | 100 | 100 | 100 | 100 |
| | Δ (after paper passage - initial) | | 0 | 0 | 0 | 0 | 0 | 0 | 0 | 0 |
| | Surface resistivity (logΩ/□) | | 10 | 10 | 15 | 12 | 11 | 10.5 | 10 | 10 |
| | Δ (after paper passage - initial) | | 0 | 0 | 0 | 0 | 0 | 0 | 0 | 0 |
| | Volume resistivity (logΩ · cm) | | 10 | 10 | 15 | 12 | 11 | 10.5 | 10 | 10 |
| | Δ (after paper passage - initial) | | 0 | 0 | 0 | 0 | 0 | 0 | 0 | 0 |
| | Folding endurance times | | 5000 | 5000 | 5000 | 5000 | 5000 | 5000 | 5000 | 5000 |
| | Δ (after paper passage - initial) | | 0 | 0 | 0 | 0 | 0 | 0 | 0 | 0 |

TABLE 9

| | | | Comparative example | | | | | | | | |
|---|---|---|---|---|---|---|---|---|---|---|---|
| | | | Comparative example 1 | Comparative example 2 | Comparative example 3 | Comparative example 4 | Comparative example 5 | Comparative example 6 | Comparative example 7 | Comparative example 8 | Comparative example 9 |
| | Layer construction | | A | A | A | A/B | A/B | A/B | A/B | A/B | A/B |
| | Polyimide endless belt | | D-1 | D-2 | D-3 | D-4 | D-6 | D-7 | D-8 | D-9 | D-10 |
| Belt substrate | Coating liquid used | | A-1 | A-2 | A-3 | A-1 | A-1 | A-1 | A-1 | A-1 | A-1 |
| | Film thickness after drying (substrate layer)μm | | 100 | 100 | 100 | 100 | 100 | 100 | 100 | 100 | 100 |
| Surface layer | Nozzle A | Coating liquid used | — | — | — | B-2 | B-3 | B-4 | B-5 | B-6 | B-7 |
| | | Discharge amount μl/s · $\mu m^2$ | — | | — | 10 | 10 | 10 | 10 | 10 | 10 |
| | | Discharge time | — | — | — | 23 seconds | 23 seconds | 23 seconds | 23 seconds | 23 seconds | 23 seconds |
| | Film thickness after drying (substrate + surface layer) | | 120 | 120 | 120 | 120 | 120 | 120 | 120 | 120 | 120 |
| Initial property | Film thickness μm | | 100 | 100 | 100 | 100 | 100 | 100 | 100 | 100 | 100 |
| | Surface resistivity (logΩ/□) | | 10 | 10 | 10 | 10 | 10 | 15 | 12 | 11 | 10.5 |
| | Volume resistivity (logΩ · cm) | | 10 | 10 | 10 | 10 | 10 | 15 | 12 | 11 | 10.5 |
| | Folding endurance times | | 4000 | 4000 | 4000 | 2000 | 2000 | 2000 | 2000 | 2000 | 2000 |
| | Printed image quality | Density unevenness | B | B | B | C | C | C | C | C | C |
| | | Spot defect | B | B | B | C | C | C | C | C | C |
| Property after paper passage test | Film thickness μm | | 100 | 100 | 100 | 100 | 100 | 100 | 100 | 100 | 100 |
| | Δ (after paper passage - initial) | | 0 | 0 | 0 | 0 | 0 | 0 | 0 | 0 | 0 |
| | Surface resistivity (logΩ/□) | | 9.5 | 9.5 | 9.5 | 8 | 8 | 13 | 10 | 9 | 8.5 |
| | Δ (after paper passage - initial) | | −0.5 | −0.5 | −0.5 | −2 | −2 | −2 | −2 | −2 | −2 |
| | Volume resistivity (logΩ · cm) | | 9.5 | 9.5 | 9.5 | 8 | 8 | 13 | 10 | 9 | 8.5 |
| | Δ (after paper passage - initial) | | 0.5 | 0.5 | 0.5 | −2 | −2 | −2 | −2 | −2 | −2 |
| | Folding endurance times | | 3000 | 3000 | 3000 | 1000 | 1000 | 1000 | 1000 | 1000 | 1000 |
| | Δ (after paper passage - initial) | | −1000 | −1000 | −1000 | −1000 | −1000 | −1000 | −1000 | −1000 | −1000 |

In the Table, "—" shows not formed.

Example 17

When the endless belt manufactured in Example 1 is incorporated as the recording paper transport belt in the apparatus of FIG. 3, and image formation is evaluated using a C2 paper manufactured by Fuji Xerox Co., Ltd, a better image may be formed without any problem.

From the above results, it is seen that belts in Examples are more excellent in mechanical strength, electric properties and stability than those in Comparative Examples.

What is claimed is:

1. An endless belt comprising a layer comprising at least a first composition and a second composition different from the first composition, a content ratio of the second composition relative to the first composition being continuously changed in a layer thickness direction, wherein the first composition and the second composition each comprise at least a resin material and a conductive agent, and the resin material is different in each of the compositions.

2. The endless belt according to claim 1, wherein a content ratio of the second composition relative to the first composition is linearly changed in a layer thickness direction.

3. The endless belt according to claim 1, wherein the first composition and the second composition each comprise at least a resin material and a conductive agent, and a content ratio of the conductive agent relative to the resin material is different in each of the compositions.

4. The endless belt according to claim 1, comprising:

a first layer comprising at least the first composition; and a second layer formed on the first layer and comprising at least the first composition and the second composition, wherein a content ratio of the second composition relative to the first composition is continuously increased as a distance from the first layer side increases in a layer thickness direction.

5. The endless belt according to claim 4, further comprising a third layer formed on the second layer and comprising at least the second composition.

6. The endless belt according to claim 1, comprising:

a belt substrate comprising the first composition;

a first layer formed on the belt substrate and comprising at least the first composition; and a second layer formed on the first layer and comprising at least the first composition and the second composition, wherein a content ratio of the second composition relative to the first composition is continuously increased as a distance from the first layer side increases in a layer thickness direction.

7. The endless belt according to claim 6, further comprising a third layer formed on the second layer and comprising at least the second composition.

8. An image forming apparatus comprising the endless belt as defined in claim 1.

9. A transport apparatus comprising the endless belt as defined in claim 1, transporting a body to be transported by the endless belt.

10. An intermediate transfer belt comprising a layer comprising at least a first composition and a second composition different from the first composition, a content ratio of the second composition relative to the first composition being continuously changed in a layer thickness direction, wherein the first composition and the second composition each comprise at least a resin material and a conductive agent, and the resin material is different in each of the compositions.

11. A transfer transport belt comprising a layer comprising at least a first composition and a second composition different from the first composition, a content ratio of the second composition relative to the first composition being continuously changed in a layer thickness direction, wherein the first composition and the second composition each comprise at least a resin material and a conductive agent, and the resin material is different in each of the compositions.

* * * * *